(12) United States Patent
Atsumi et al.

(10) Patent No.: US 8,018,341 B2
(45) Date of Patent: Sep. 13, 2011

(54) SEMICONDUCTOR DEVICE AND WIRELESS COMMUNICATION SYSTEM USING THE SAME

(75) Inventors: Tomoaki Atsumi, Isehara (JP); Yutaka Shionoiri, Isehara (JP); Hidetomo Kobayashi, Isehara (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 978 days.

(21) Appl. No.: 11/919,497

(22) PCT Filed: May 17, 2006

(86) PCT No.: PCT/JP2006/310283
§ 371 (c)(1),
(2), (4) Date: Oct. 29, 2007

(87) PCT Pub. No.: WO2006/123826
PCT Pub. Date: Nov. 23, 2006

(65) Prior Publication Data
US 2009/0079572 A1 Mar. 26, 2009

(30) Foreign Application Priority Data
May 19, 2005 (JP) .................................. 2005-147059

(51) Int. Cl.
*G08B 13/14* (2006.01)
(52) U.S. Cl. .................. 340/572.1; 340/572.7; 340/634; 340/653
(58) Field of Classification Search ............... 340/572.1, 340/572.4, 572.7, 825.69, 825.72, 572.8, 340/634, 653; 235/487, 492, 375, 376, 380, 235/383
See application file for complete search history.

(56) References Cited

U.S. PATENT DOCUMENTS

| 4,855,994 | A | * | 8/1989 | Takeuchi et al. ............. 370/480 |
| 6,321,067 | B1 | | 11/2001 | Suga et al. |
| 6,427,065 | B1 | | 7/2002 | Suga et al. |

(Continued)

FOREIGN PATENT DOCUMENTS

EP 0 829 940 3/1998

(Continued)

OTHER PUBLICATIONS

International Search Report (Application No. PCT/JP2006/310283) dated Aug. 29, 2006.

(Continued)

*Primary Examiner* — Hung T. Nguyen
(74) *Attorney, Agent, or Firm* — Eric J. Robinson; Robinson Intellectual Property Law Office, P.C.

(57) ABSTRACT

Initialization of a semiconductor device can be efficiently performed, which transmits and receives data through wireless communication. The semiconductor device includes an antenna, a power source circuit, a circuit which uses a DC voltage generated by the power source circuit as a power source voltage, and a resistor. The antenna includes a pair of terminals and receives a wireless signal (a modulated carrier wave). The power source circuit includes a first terminal and a second terminal and generates a DC voltage between the first terminal and the second terminal by using a received wireless signal (the modulated carrier wave). The resistor is connected between the first terminal and the second terminal. In this manner, the semiconductor device and the wireless communication system can transmit and receive data accurately.

14 Claims, 16 Drawing Sheets

U.S. PATENT DOCUMENTS

| | | | |
|---|---|---|---|
| 6,816,712 B2 * | 11/2004 | Otaka et al. | 455/83 |
| 6,848,620 B2 * | 2/2005 | Nakane et al. | 235/492 |
| 7,017,822 B2 * | 3/2006 | Aisenbrey | 235/487 |
| 2004/0207565 A1 * | 10/2004 | Hibino et al. | 343/860 |

FOREIGN PATENT DOCUMENTS

| | | |
|---|---|---|
| EP | 1 251 458 | 10/2002 |
| JP | 10-095189 | 4/1998 |
| JP | 10-145987 | 5/1998 |
| JP | 2000-348152 | 12/2000 |
| JP | 2002-319007 | 10/2002 |

OTHER PUBLICATIONS

Written Opinion (Application No. PCT/JP2006/310283) dated Aug. 29, 2006.

* cited by examiner

SEMICONDUCTOR DEVICE AND WIRELESS COMMUNICATION SYSTEM USING THE SAME

TECHNICAL FIELD

The present invention relates to a semiconductor device which can transmit and receive data through wireless communication. Such a semiconductor device is called a wireless tag, an RF tag, an RFID tag, an IC tag, an ID tag, an electronic tag, a transponder, a wireless memory, an RFID chip, a wireless chip, an ID chip, a wireless IC card, an ID card, or the like. In particular, the invention relates to a semiconductor device which receives wireless signals generated from a reader/writer through an antenna and generates a power source voltage required for operations.

BACKGROUND ART

As is called a ubiquitous information society, in recent years, an environment has been managed so that one can access the information network whenever and wherever he/she likes. In such an environment, an individual authentication technique is attracting attentions, such that an ID (identification number) is assigned to each object, thereby the history of the object is clarified and the manufacturing, management, or the like is facilitated. In particular, a semiconductor device which can transmit and receive data through wireless communication (hereinafter also called a wireless tag) has started to be used.

FIG. 3A shows an example of a wireless communication system using a wireless tag. The wireless communication system is formed of a reader/writer 300, a control terminal 302, and a wireless tag 303. The control terminal 302 controls the reader/writer 300. Data is transmitted and received wirelessly between an antenna 301 connected to the reader/writer 300 and an antenna 304 in the wireless tag 303.

Wireless data transmission and reception are performed as follows. The antenna 304 in the wireless tag 303 receives a wireless signal outputted from the antenna 301 connected to the reader/writer 300. The wireless signal is an electromagnetic wave which is modulated in accordance with the data to be transmitted. The electromagnetic wave for transmitting data is called a carrier wave. A wireless signal is also called a carrier wave which is modulated in accordance with data. A wireless signal (a modulated carrier wave 330) is received by the antenna 304 and inputted to a signal processing circuit 305 in the wireless tag 303 to be processed. In this manner, the wireless tag 303 obtains data contained in the wireless signal (the modulated carrier wave 330). Subsequently, a signal containing response data is outputted from the signal processing circuit 305. The antenna 304 in the wireless tag 303 transmits a wireless signal (the modulated carrier wave 330) corresponding to the outputted signal to the antenna 301 connected to the reader/writer 300. The wireless signal (the modulated carrier wave 330) is received by the antenna 301 and the reader/writer 300 obtains the response data and accumulates the response data in the control terminal 302.

The antenna 304 in the wireless tag 303 receiving a wireless signal (the modulated carrier wave 330) outputted from the antenna 301 connected to the reader/writer 300, the wireless signal (the modulated carrier wave 330) is inputted through a band-pass filter 306 to a power source circuit 307 in the wireless tag 303. The power source circuit 307 generates a power source voltage for driving an internal circuit (corresponding to the signal processing circuit 305 or the like) in the wireless tag 303 from the inputted wireless signal (the modulated carrier wave 330).

In specific, the power source circuit 307 includes a rectifying circuit 308 which converts the inputted wireless signal (the modulated carrier wave 330) into a DC signal, and a holding capacitor 309 which smoothes the DC signal. In this manner, the power source circuit 307 generates a DC voltage between a first terminal 310 and a second terminal 311. The generated DC voltage is supplied as a power source voltage to an internal circuit of the wireless tag 303.

A wireless tag which generates a power source voltage for driving an internal circuit by using a wireless signal (the modulated carrier wave 330) as described above is disclosed in, for example, Patent Document 1.

[Patent Document 1]
Japanese Patent Laid-open No. 2002-319007

SUMMARY OF THE INVENTION

In a wireless communication system using the wireless tag 303 as shown in FIG. 3A, the relation between the wireless signal (the modulated carrier wave 330) and the power source voltage generated by using the wireless signal (the modulated carrier wave 330) is schematically shown in FIG. 3B. The power source voltage is expressed by a change in a potential 331 of the second terminal 311 while fixing a potential 332 of the first terminal 310 constant. As shown in FIG. 3B, a period in which a wireless signal (the modulated carrier wave 330) is outputted from the antenna 301 connected to the reader/writer 300 (referred to as a period 1) and a period in which it is not outputted at all (referred to as a period 2) are alternately provided normally. In a period in which a wireless signal (the modulated carrier wave 330) is not inputted, it is required that the power source voltage is decreased to zero or the potential 331 of the second terminal 311 is decreased to be close to the potential 332 of the first terminal 310.

The power source voltage is decreased to zero or the potential 331 of the second terminal 311 is decreased to be close to the potential 332 of the first terminal 310 in the period in which a wireless signal (the modulated carrier wave 330) is not inputted (the period 2) in order to initialize the circuit in the wireless tag 303 by decreasing the power source voltage of the wireless tag 303 to zero or a level close to zero periodically. In this manner, by initializing the circuit in the wireless tag 303 every time a new wireless signal (the modulated carrier wave 330) is received, the wireless tag 303 can receive a signal transmitted from the reader/writer 300 accurately in accordance with the standard, while the signal in accordance with the standard can be accurately transmitted to the reader/writer 300.

However, in actuality, there is a problem that the power source voltage does not decrease to zero or the potential of the second terminal 311 does not decrease to be close to the potential of the first terminal 310. That is, there is a problem that a power source voltage of $\Delta V$ or higher is always generated even in the period 2. In particular, the aforementioned problem is a big issue when the capacitance of the holding capacitor 309 of the power source circuit 307 is set as large as about several hundreds pF in order to obtain a higher power source voltage.

In the period 2, the wireless tag 303 cannot be initialized sufficiently unless the power source voltage (voltage between the first terminal 310 and the second terminal 311) becomes zero or the potential of the second terminal 311 becomes close to the potential of the first terminal 310. Without being initialized, the wireless tag 303 cannot receive a signal transmitted from the reader/writer 300 and transmit a signal in response to the reader/writer 300. Further, in the case where the initialization is not performed, once the wireless tag 303 fails to receive a signal, all the following operations performed by the wireless tag 303 end in malfunctions.

In view of the aforementioned, in the invention, initialization of a semiconductor device is efficiently performed, which transmits and receives data through wireless communication.

In a semiconductor device of the invention which generates a power source voltage from a carrier wave, a resistor is connected between a pair of terminals (a first terminal and a second terminal) which apply the power source voltage to an internal circuit of the semiconductor device.

That is, the semiconductor device of the invention includes an antenna, a power source circuit, a circuit which uses a DC voltage generated by the power source circuit as a power source voltage, and a resistor. The antenna includes a pair of terminals and receives a wireless signal (a modulated carrier wave). The power source circuit includes a first terminal and a second terminal, and generates a DC voltage between the first terminal and the second terminal by using the received wireless signal (the modulated carrier wave). The resistor is connected between the first terminal and the second terminal.

The semiconductor device of the invention can be efficiently initialized. Therefore, the semiconductor device of the invention can transmit and receive data accurately. Moreover, the semiconductor device of the invention is initialized even when it fails to receive a signal once, therefore, the following operations can be accurately performed. In this manner, a semiconductor device with high reliability and a wireless communication system using the semiconductor device are provided.

BEST MODE FOR CARRYING OUT THE INVENTION

Although the invention will be fully described by way of embodiment modes and embodiments with reference to the accompanying drawings, it is to be understood that various changes and modifications will be apparent to those skilled in the art. Therefore, unless such changes and modifications depart from the scope of the invention, they should be construed as being included therein.

Embodiment Mode 1

Figure 3A:
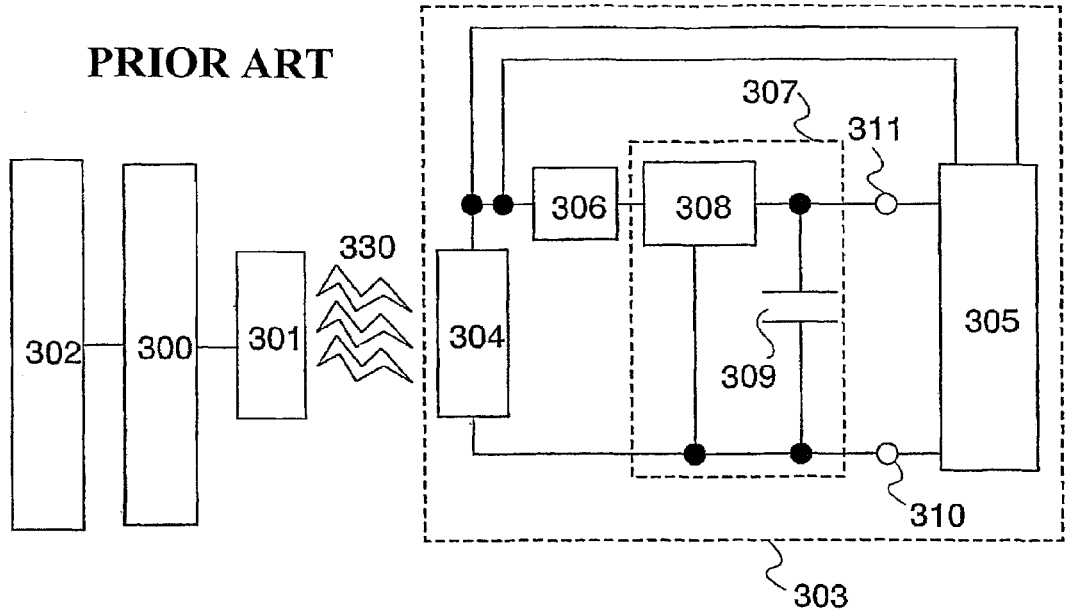
FIG. 3A is a diagram showing a configuration of a conventional semiconductor device and FIG. 3B is a diagram showing characteristics thereof.
Figure 3B:
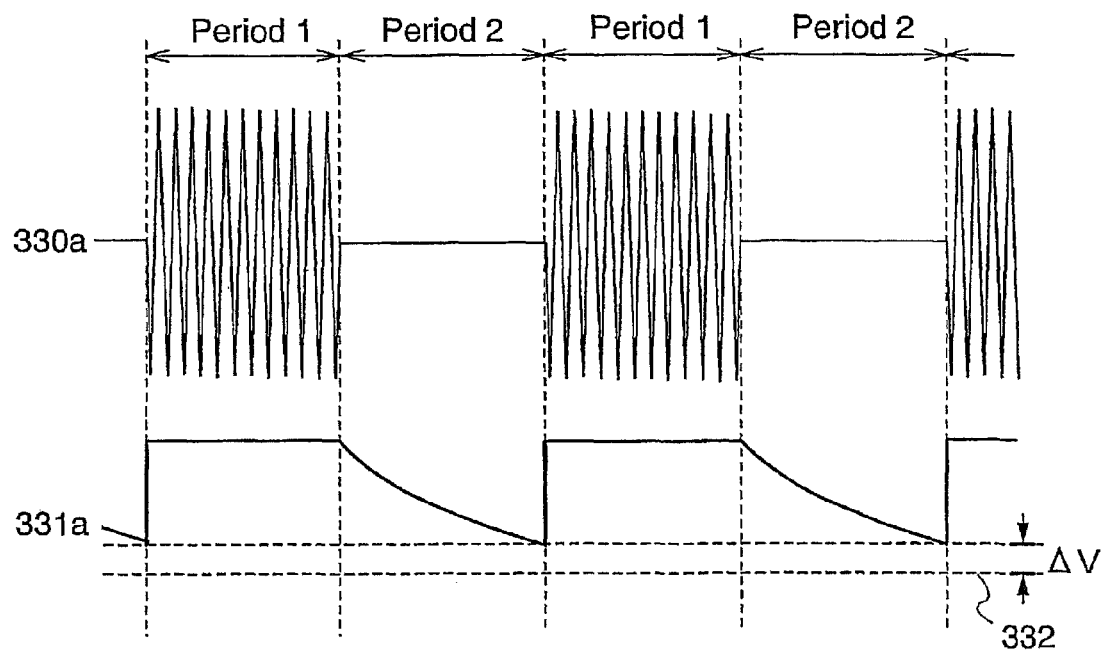

A semiconductor device of the invention is described with reference to FIG. 1. It is to be noted that the same portions in FIG. 1 as those in FIGS. 3A and 3B are denoted by the same reference numerals. The semiconductor device 101 includes the antenna 304, the band-pass filter 306, the power source circuit 307, a circuit which uses the DC voltage generated by the power source circuit 307 as a power source voltage (the signal processing circuit 305 is shown as a representative), and a resistor 100. The antenna 304 includes a pair of terminals and receives a wireless signal (a modulated carrier wave). The band-pass filter 306 is connected between one of the pair of terminals of the antenna 304 and an input of the power source circuit 307. The power source circuit 307 includes the first terminal 310 and the second terminal 311, and generates a DC voltage between the first terminal 310 and the second terminal 311 by using the received wireless signal (the modulated carrier wave). The resistor 100 is connected between the first terminal 310 and the second terminal 311.

The same potentials may be applied to the other of the pair of terminals of the antenna 304 and the first terminal 310. The other of the pair of terminals of the antenna 304 and the first terminal 310 may be grounded.

Further, the power source circuit 307 can be formed of the rectifying circuit 308 and the holding capacitor 309. The rectifying circuit 308 rectifies a wireless signal (a modulated carrier wave) and converts it to a DC signal. The holding capacitor 309 smoothes the DC signal outputted from the rectifying circuit 308. The signal smoothed by the holding capacitor 309 is outputted as a DC voltage between the first terminal 310 and the second terminal 311. Either a circuit which performs full-wave rectification or a circuit which performs half-wave rectification may be used as the rectifying circuit 308.

A resistor formed using a semiconductor layer can be used as the resistor 100. For example, the signal processing circuit 305 may be formed using a thin film transistor and the resistor 100 may be formed using a semiconductor layer which is formed simultaneously with a semiconductor layer which functions as an active layer of the thin film transistor. In this case, impurity elements which impart conductivity may be added to the semiconductor layer which forms the resistor 100. In a resistor formed using a semiconductor layer to which impurity elements which impart conductivity are added, variations in resistance can be less than in a resistor formed using a semiconductor layer to which impurity elements which impart conductivity are not added. In particular, in the case of using a polycrystalline semiconductor film as a semiconductor layer which forms the resistor 100, variations in resistance caused by the variations in crystallinity of the film become notable. Therefore, it is effective to add impurity elements which impart conductivity to the semiconductor layer which forms the resistor 100.

Impurity elements which impart conductivity may be added to the semiconductor layer which forms the resistor 100 at approximately the same concentration as those added to a channel forming region of the thin film transistor. In the case of using an amorphous semiconductor film formed by a CVD method or the like as a semiconductor layer, it is known that the formed amorphous semiconductor film slightly has n-type conductivity. By adding impurity elements which impart conductivity to the amorphous semiconductor film, the conductivity of the semiconductor layer can be nearly intrinsic and high resistance thereof can be obtained. As the resistor can be formed utilizing manufacturing steps of a thin film transistor which forms the signal processing circuit 305, the manufacturing cost of a semiconductor device can be suppressed and the yield thereof can be improved.

A diode or a thin film transistor may be used as the resistor 100. For example, a thin film transistor which is diode-connected (a gate and a drain thereof are electrically connected) may also be used.

The frequency of the carrier wave may be any one of 300 GHz to 3 THz as a submillimeter wave, 30 to 300 GHz as a millimeter wave, 3 to 30 GHz as a microwave, 300 MHz to 3 GHz as an ultra high wave, 30 to 300 MHz as a very high wave, 3 to 30 MHz as a short wave, 300 KHz to 3 MHz as a medium wave, 30 to 300 kHz as a long wave, and 3 to 30 kHz as a very long wave.

The antenna 304 may be any one of a dipole antenna, a patch antenna, a loop antenna, and a Yagi antenna.

A wireless signal may be transmitted and received by the antenna 304 by any one of an electromagnetic coupling method, an electromagnetic induction method, and a radio wave method.

A wireless communication system of the invention can use a semiconductor device 101, a reader/writer with a known structure, an antenna connected to the reader/writer, and a control terminal for controlling the reader/writer. The semiconductor device 101 and the antenna connected to the reader/writer communicate by one-way communication or two-way communication, employing any one of a Space Division Multiplex method, a Polarization Division Multiplex method, a Frequency Division Multiplex method, a Time Division Multiplex method, a Code Division Multiplex method, and an Orthogonal Frequency Division Multiplex method.

Figure 4A:
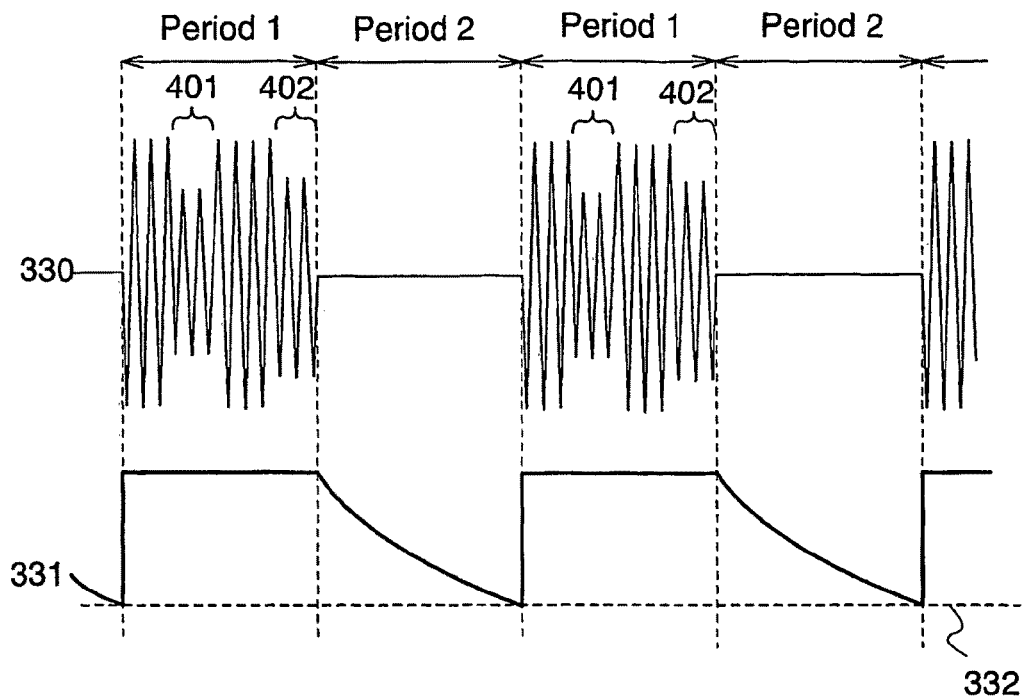
FIG. 4A is a diagram showing characteristics of a semiconductor device of the invention and FIG. 4B is a diagram showing characteristics of a conventional semiconductor device.
Figure 4B:
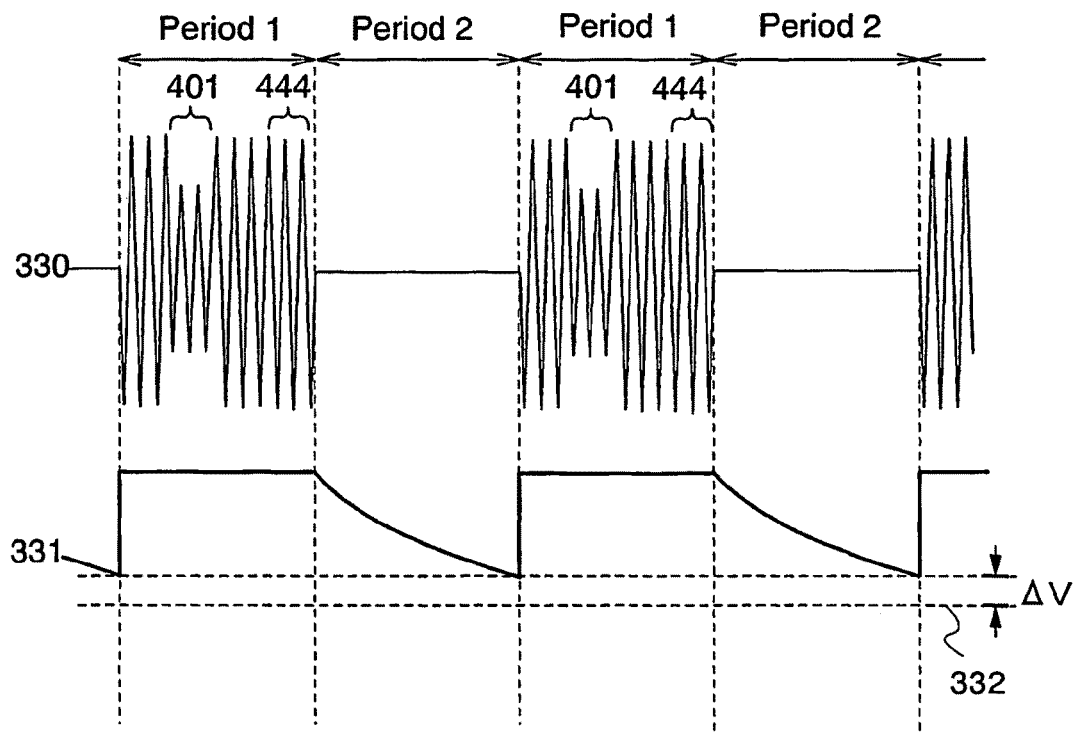

FIG. 4A shows a relation between a wireless signal (a modulated carrier wave) and a power source voltage (expressed by a change in the potential 331 of the second terminal 311 while fixing the potential 332 of the first terminal 310 constant) generated by using the wireless signal (the modulated carrier wave) in a wireless communication system of the invention using the semiconductor device 101. FIG. 4B shows a relation between a wireless signal (a modulated carrier wave) and a power source voltage generated by using the wireless signal (the modulated carrier wave) in a wireless communication system using a conventional semiconductor device (the wireless tag 303).

In FIGS. 4A and 4B, a first signal 401 is a signal which corresponds to the data transmitted from a reader/writer. A carrier wave which is modulated in amplitude is used as the first signal 401 as an example. It is to be noted that the carrier wave is modulated by analog modulation or digital modulation, for which any one of amplitude modulation, phase modulation, frequency modulation, and spread spectrum may be employed.

A wireless communication system using a semiconductor device of the invention can decrease a power source voltage to zero or decrease the potential 331 of the second terminal 311 to be close to the potential 332 of the first terminal 310 in a period (period 2) in which a wireless signal (the modulated carrier wave 330) is not inputted. Therefore, a semiconductor device which receives the first signal 401 transmitted from the reader/writer transmits a second signal 402 corresponding to response data. In this manner, the semiconductor device transmits and receives data normally.

On the other hand, as shown in FIG. 4B, a wireless communication system using a conventional semiconductor device cannot decrease a power source voltage to zero or decrease the potential 331 of the second terminal 311 to be close to the potential 332 of the first terminal 310 in a period (period 2) in which a wireless signal (the modulated carrier wave 330) is not inputted. Therefore, a power source voltage of ΔV or higher is always generated. As a result, a semiconductor device which receives the first signal 401 which is transmitted from a reader/writer cannot respond (see waveforms 444 in FIG. 4B), which causes a malfunction in data transmission and reception.

As described above, the invention can provide a semiconductor device which performs data transmission and reception normally and a wireless communication system using the semiconductor device.

Embodiment Mode 2

In this embodiment mode, an example of the signal processing circuit 305 in the semiconductor device 101 described in Embodiment Mode 1 is described with reference to FIG. 2. It is to be noted that the same portions in FIG. 2 as those in FIG. 1 are denoted by the same reference numerals and detailed description thereof is omitted.

The signal processing circuit 305 includes a band-pass filter 200, a demodulation circuit 201, an analyzing circuit 202, and a memory 203. A wireless signal (a modulated carrier wave) received by the antenna 304 is inputted to the demodulation circuit 201 through the band-pass filter 200. The demodulation circuit 201 demodulates information from the wireless signal (the modulated carrier wave). The analyzing circuit 202 analyzes the information demodulated by the demodulation circuit 201 and outputs corresponding data. The memory 203 operates based on the data analyzed by the analyzing circuit 202. That is, the memory 203 stores the data analyzed by the analyzing circuit 202. Alternatively, the memory 203 reads out the data stored in the memory 203. The data stored in the memory 203 may be data stored when the semiconductor device 101 is manufactured, or data received by the semiconductor device 101 through wireless communication and stored in the memory 203. It is to be noted that one or both of a rewritable memory and a non-rewritable memory can be used as the memory 203.

The memory 203 provided in the semiconductor device may be a DRAM (Dynamic Random Access Memory), an SRAM (Static Random Access Memory), an FeRAM (Ferroelectric Random Access Memory), a mask ROM (Read Only Memory), an EPROM (Electrically Programmable Read Only Memory), an EEPROM (Electrically Erasable and Programmable Read Only Memory), or a flash memory.

The signal processing circuit 305 can further include an encoding circuit 204 and a modulation circuit 205. The encoding circuit 204 encodes the data stored in the memory 203 in accordance with a predetermined standard and converts it to corresponding information. The modulation circuit 205 outputs the modulated signal in accordance with the information encoded by the encoding circuit 204.

The encoding circuit 204 has a circuit configuration capable of encoding based on the standard, such as Manchester encoding, NRZ (Non Return Zero) encoding, and Miller encoding.

Figure 2:
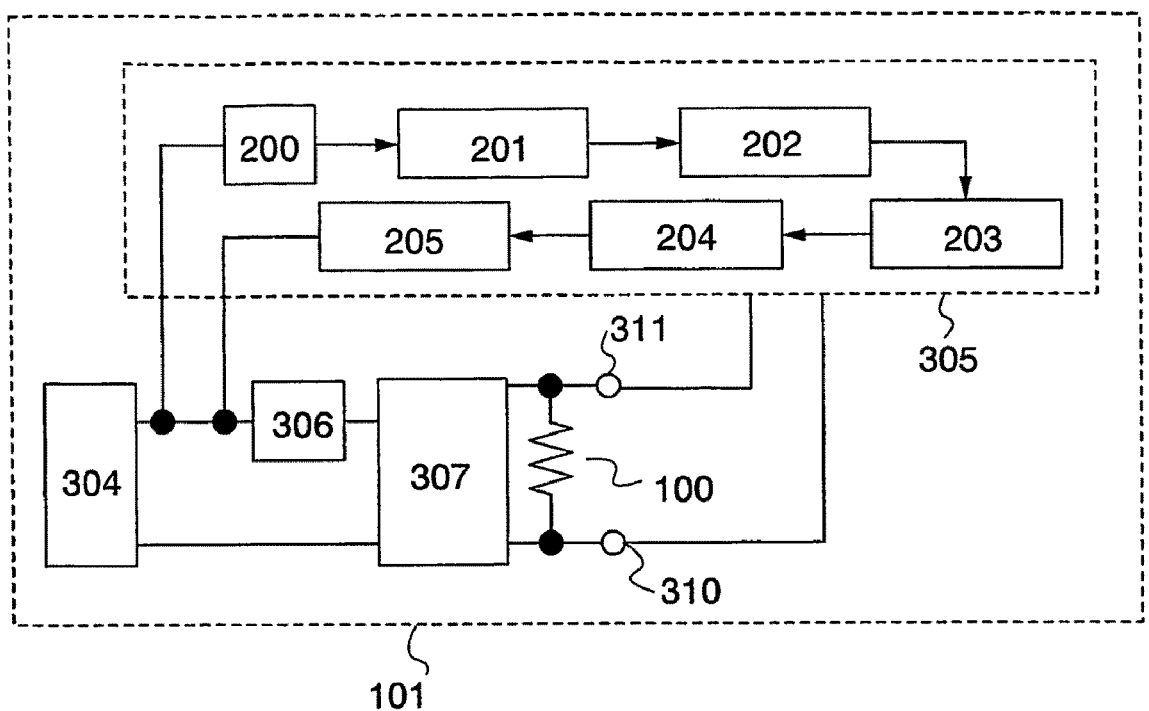
FIG. 2 is a diagram showing a configuration of a semiconductor device of the invention.

FIG. 2 shows an example where the band-pass filter 200 is provided in addition to the band-pass filter 306, however, the invention is not limited to this. The band-pass filter 200 and the band-pass filter 306 may be used in common.

This embodiment mode can be freely implemented in combination with Embodiment Mode 1.

Embodiment Mode 3

Figure 5:
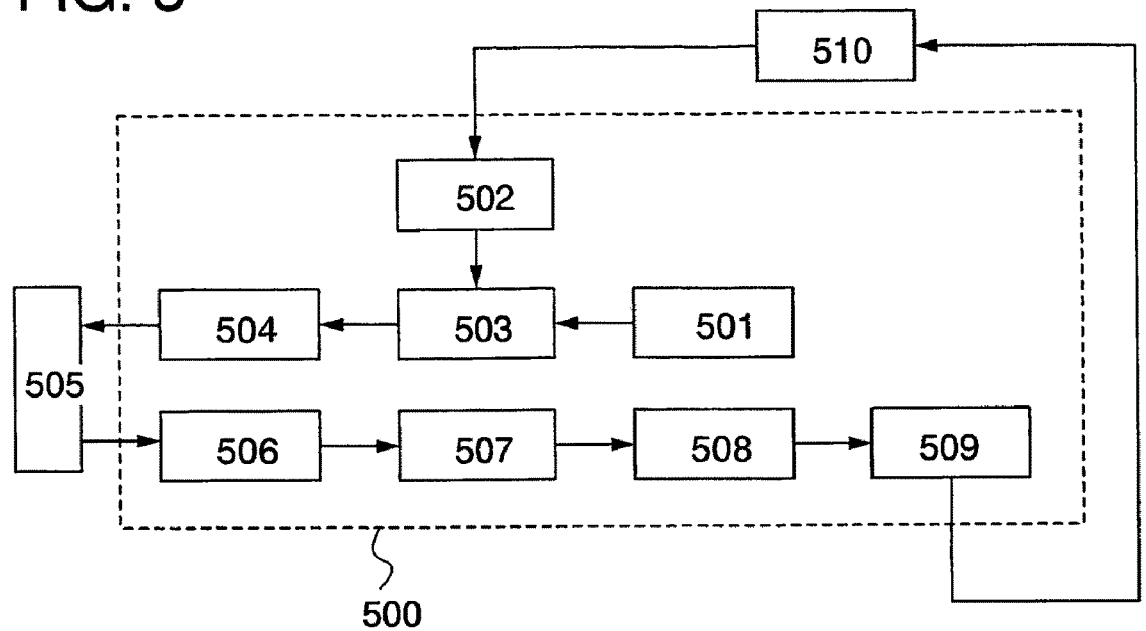
FIG. 5 is a diagram showing a configuration of a reader/writer.

In this embodiment mode, an example of a reader/writer of a wireless communication system using the semiconductor device 101 described in Embodiment Modes 1 and 2 is described with reference to FIG. 5.

A reader/writer 500 includes an oscillation circuit 501, an encoding circuit 502, a modulation circuit 503, an amplifier circuit 504, a band-pass filter 506, an amplifier circuit 507, a demodulation circuit 508, and an analyzing circuit 509. Moreover, an antenna 505 is connected to the reader/writer 500.

First, description is made of the case where the reader/writer 500 transmits a signal. The oscillation circuit 501 generates a signal of a predetermined frequency. The generated signal is inputted to the modulation circuit 503. The encoding circuit 502 encodes transmission data inputted from a control terminal 510 and converts it to corresponding information. The modulation circuit 503 modulates the signal in accordance with the encoded information. The modulated signal is inputted to the amplifier circuit 504 and amplified therein. The amplified signal is transmitted as a wireless signal (a modulated carrier wave) from the antenna 505.

Next, description is made of the case where the reader/writer 500 receives a signal. The wireless signal (the modulated carrier wave) is received by the antenna 505. The received wireless signal (the modulated carrier wave) is inputted to the band-pass filter 506 to remove noise and the like therein. The signal which passed the band-pass filter 506 is inputted to the amplifier circuit 507 and amplified therein. The amplified signal is inputted to the demodulation circuit 508. The demodulation circuit 508 demodulates information from the inputted signal. The demodulated information is inputted to the analyzing circuit 509. The analyzing circuit 509 analyzes the inputted information and obtains reception data. The obtained reception data is outputted to the control terminal 510.

The encoding circuit 502 has a circuit configuration capable of encoding based on the standard, such as Manchester encoding, NRZ (Non Return Zero) encoding, and Miller encoding.

The antenna 505 may be any one of a dipole antenna, a patch antenna, a loop antenna, and a Yagi antenna.

A wireless signal (a modulated carrier wave) may be transmitted and received at the antenna 505 by any one of an electromagnetic coupling method, an electromagnetic induction method, and a radio wave method.

This embodiment mode can be freely implemented in combination with Embodiment Modes 1 and 2.

Embodiment 1

In this embodiment, specific configurations of a semiconductor device of the invention are described with reference to FIGS. 6A to 7D.

Figure 1:
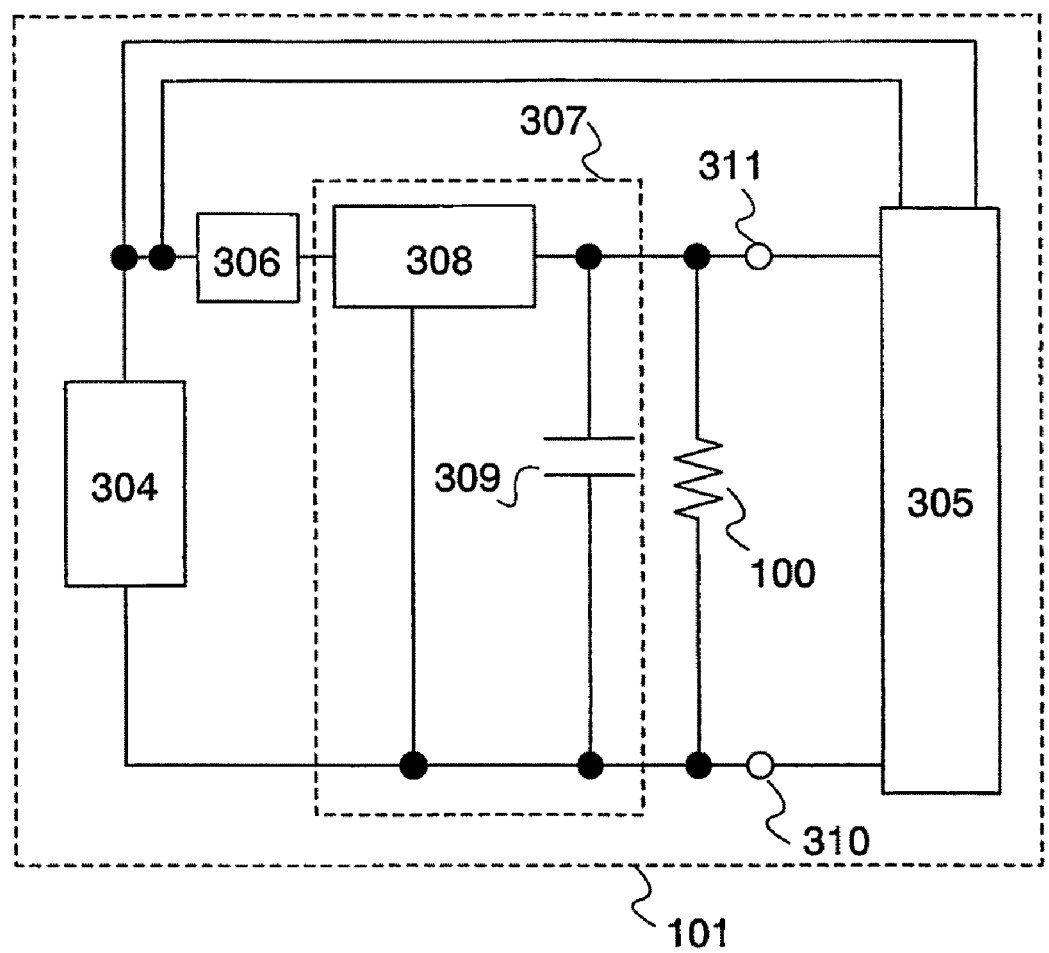
FIG. 1 is a diagram showing a configuration of a semiconductor device of the invention.
Figure 6A:
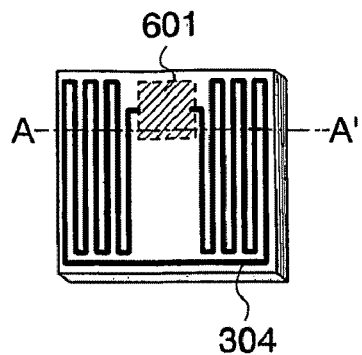
FIGS. 6A to 6D are views showing structures of antennas of a semiconductor device of the invention.
Figure 6B:
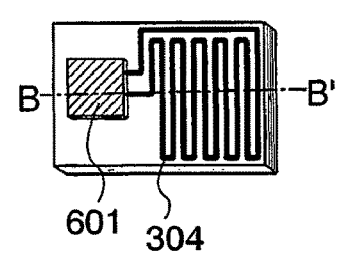
Figure 6C:
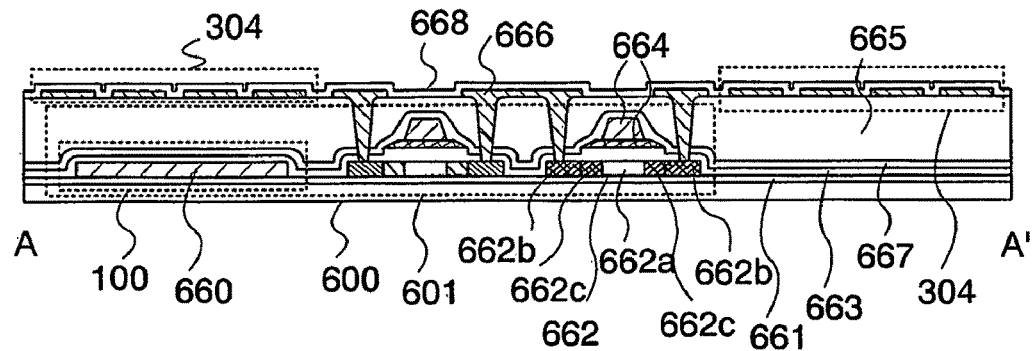
Figure 6D:
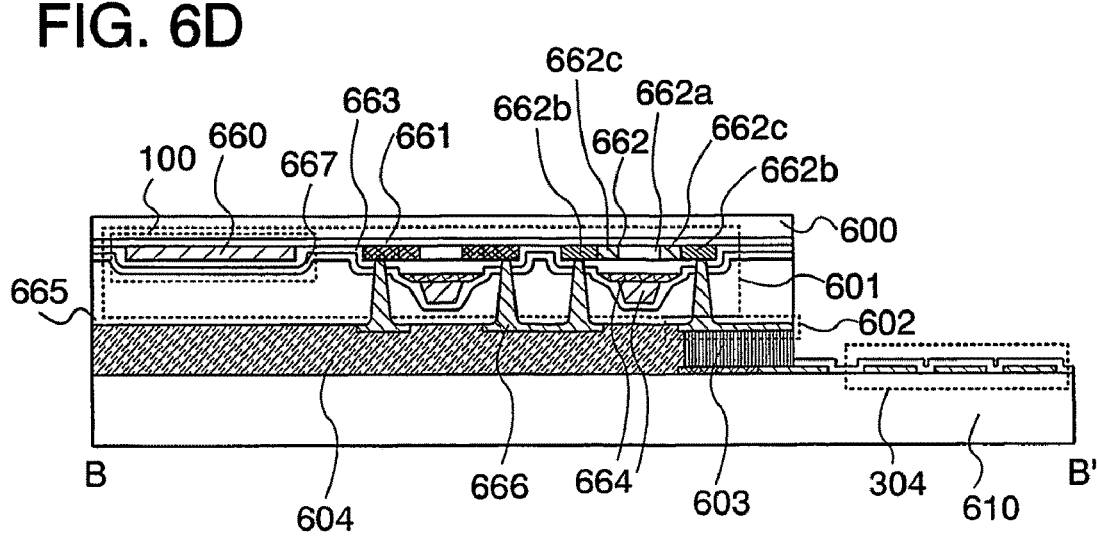

FIGS. 6A to 6D show configuration examples of the antenna 304 in the semiconductor device 101 shown in FIGS. 1 and 2. The antenna 304 can be provided in two ways. FIGS. 6A and 6C show one way (hereinafter called a first antenna configuration) while FIGS. 6B and 6D show the other way (hereinafter called a second antenna configuration). FIG. 6C is a cross sectional view along A-A' in FIG. 6A and FIG. 6D is a cross sectional view along B-B' in FIG. 6B.

In the first antenna configuration, the antenna 304 is provided over a substrate 600 provided with a plurality of elements (hereinafter called an element group 601) (see FIGS. 6A and 6C). The element group 601 forms circuits other than the antenna of the semiconductor device of the invention. The element group 601 includes a plurality of thin film transistors and the resistor 100. The resistor 100 is formed using a semiconductor layer 660 which is formed simultaneously with a semiconductor layer 662 which functions as an active layer of the thin film transistor. In the shown configuration, a conductive film which functions as the antenna 304 is provided in the same layer as a wire connected to a source or a drain of the thin film transistor in the element group 601. However, the conductive film which functions as the antenna 304 may be provided in the same layer as a gate electrode 664 of the thin film transistor in the element group 601, or over an insulating film which is provided so as to cover the element group 601.

In the second antenna configuration, a terminal portion 602 is provided over the substrate 600 provided with the element group 601. The antenna 304 provided over a substrate 610 which is a different substrate from the substrate 600 is connected to the terminal portion 602 (see FIGS. 6B and 6D). In the shown configuration, a portion of a wire connected to a source or a drain of the thin film transistor in the element group 601 is used as the terminal portion 602. The substrate 600 and the substrate 610 provided with the antenna 304 are attached to each other so as to be connected at the terminal portion 602. A conductive particle 603 and a resin 604 are provided between the substrate 600 and the substrate 610. The antenna 304 and the terminal portion 602 are electrically connected by the conductive particle 603.

A configuration and a manufacturing method of the element group 601 are described. Formed over a large substrate in a plural numbers and divided later to be completed by cutting the large substrate, the element groups 601 can be inexpensively provided. As the substrate 600, for example, a glass substrate such as barium borosilicate glass and alumino borosilicate glass, a quartz substrate, a ceramic substrate, or the like can be used. Moreover, a semiconductor substrate over which an insulating film is formed may be used as well. A substrate formed of a synthetic resin having flexibility such as plastic may also be used. The surface of the substrate may be planarized by polishing by a CMP method or the like. Moreover, a substrate which is formed thin by polishing a glass substrate, a quartz substrate, or a semiconductor substrate may be used as well.

As a base film 661 provided over the substrate 600, an insulating film such as silicon oxide, silicon nitride, or silicon nitride oxide can be used. The base film 661 can prevent an alkali metal such as Na or an alkaline earth metal contained in the substrate 600 from dispersing into the semiconductor layer 662 and adversely affecting the characteristics of the thin film transistor. In FIGS. 6C and 6D, the base film 661 is formed of a single layer, however, it may be formed of two or more layers. It is to be noted that the base film 661 is not always required to be provided when the dispersion of impurities is not a big problem, such as the case of using a quartz substrate.

It is to be noted that high density plasma may be directly applied to the surface of the substrate 600. The high density plasma is, for example, generated by using a high frequency of 2.45 GHz. It is to be noted that high density plasma with an electron density of $10^{11}$ to $10^{13}$ cm$^{-3}$, an electron temperature of 2 eV or lower, and an ion energy of 5 eV or lower is used. In this manner, high density plasma which features low electron temperature has low kinetic energy of active species, therefore, a film with less plasma damage and defects can be formed as compared to conventional plasma treatment. Plasma can be generated by using a plasma processing apparatus utilizing a radio frequency excitation, which employs a radial slot antenna. The antenna which generates a radio frequency and the substrate 600 are placed at a distance of 20 to 80 mm (preferably 20 to 60 mm).

By performing the high density plasma treatment in an atmosphere containing nitrogen (N) and rare gas (containing at least one of He, Ne, Ar, Kr, and Xe), an atmosphere containing nitrogen, hydrogen (H), and rare gas, or an atmosphere containing ammonium ($NH_3$) and rare gas, the surface of the substrate 600 can be nitrided. In the case where the substrate 600 is formed of glass, quartz, a silicon wafer, or the like, a nitride layer formed over the surface of the substrate 600 containing silicon nitride as a main component can be used as a blocking layer against impurities which are dispersed from the substrate 600 side. A silicon oxide film or a silicon oxynitride film may be formed over the nitride layer by a plasma CVD method to be used as the base film 661.

By applying similar high density plasma treatment to the surface of the base film 661 formed of silicon oxide or silicon oxynitride, the surface and a depth of 1 to 10 nm from the surface can be nitrided. This extremely thin silicon nitride layer is favorable since it functions as a blocking layer and has less stress on the semiconductor layer 662 and the semiconductor layer 660 formed thereover.

A crystalline semiconductor film or an amorphous semiconductor film processed into an arbitrary shape can be used as the semiconductor layer 662 and the semiconductor layer 660. Moreover, an organic semiconductor film may also be used. A crystalline semiconductor film can be obtained by crystallizing an amorphous semiconductor film. A laser crystallization method, a thermal crystallization method using RTA or an annealing furnace, a thermal crystallization method using a metal element which promotes crystallization, or the like can be used as the crystallization method. The semiconductor layer 662 includes a channel forming region 662a and a pair of impurity regions 662b to which impurity elements which impart conductivity are added. Shown here is a structure where a low concentration impurity region 662c to which the impurity elements are added at a lower concentration than to the impurity regions 662b is provided between the channel forming region 662a and the pair of impurity regions 662b, however, the invention is not limited to this. The low concentration impurity region 662c is not necessarily provided. Impurity elements which impart conductivity may be added to the entire surface of the semiconductor layer 660 or may not be added thereto. In the case of adding impurity elements which impart conductivity, impurity elements which impart conductivity may be added to the semiconductor layer 660 at approximately the same concentration as the pair of impurity regions 662b of the thin film transistor or impurity elements which impart conductivity may be added thereto at approximately the same concentration as the low concentration impurity region 662c.

Figure 15A:
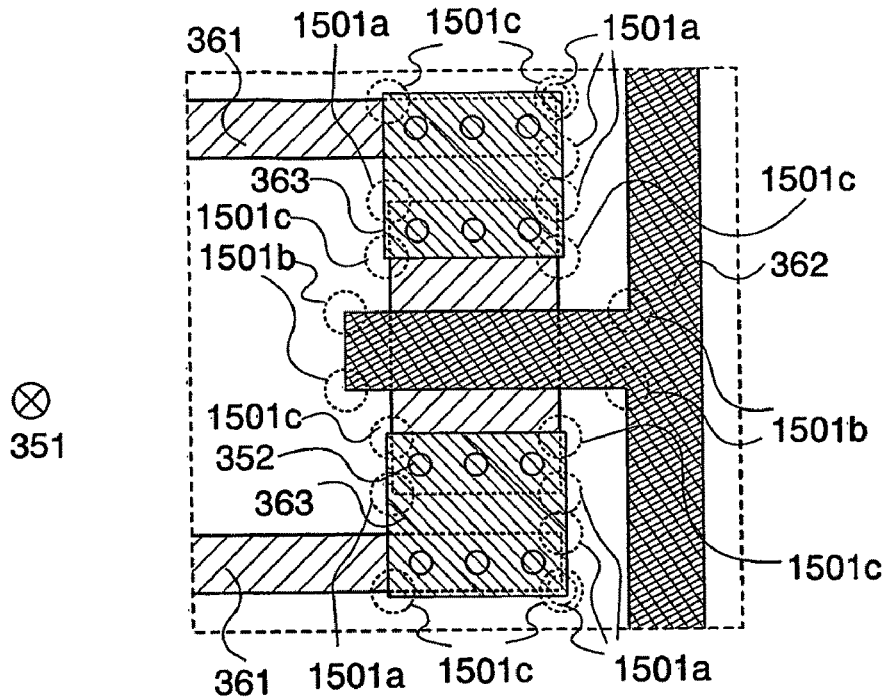
FIGS. 15A and 15B are views showing a conventional method and a method of the invention to lead wires of a semiconductor device respectively.
Figure 15B:
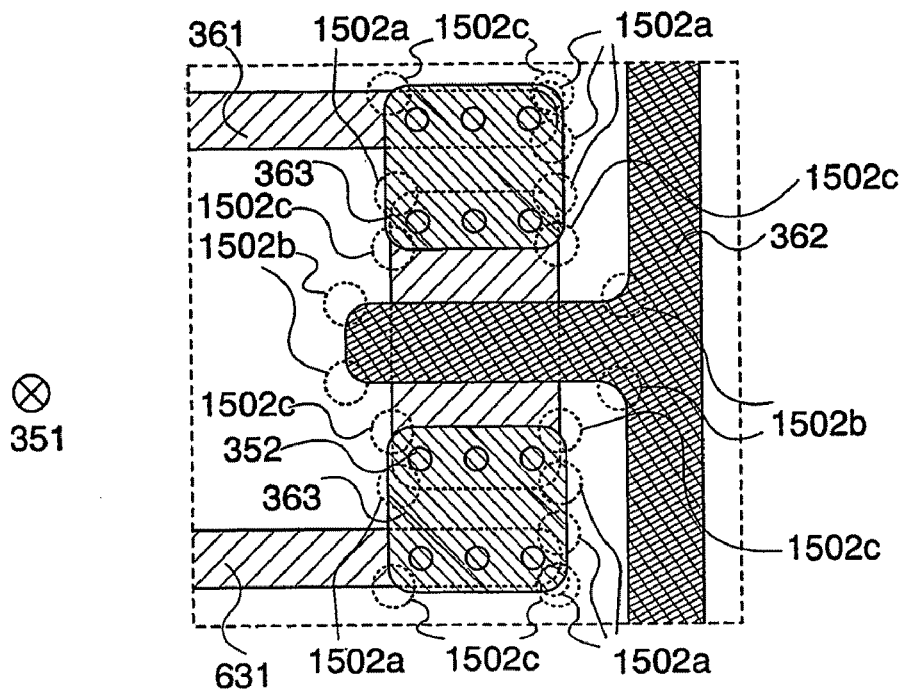

It is to be noted that the semiconductor layer 662, the semiconductor layer 660, and a wire which is formed simultaneously with these are preferably lead so that corners are rounded when seen perpendicularly to the top surface of the substrate 600. FIGS. 15A and 15B are schematic views showing the method to lead the wires. In FIGS. 15A and 15B, a direction 351 is perpendicular to the top surface of the substrate 600. Wires 361 are formed simultaneously with the semiconductor layer. FIG. 15A shows a conventional method to lead wires. FIG. 15B shows a method of the invention to lead wires. Corner portions 1502a of the wire 361 of the invention are rounded as compared to corner portions 1501a of the conventional wire 361. The rounded corner portions can prevent dusts or the like from remaining at the corner portions of the wire. In this manner, defects of a semiconductor device caused by dusts can be reduced and the yield can be improved.

Impurity elements which impart conductivity may be added to the channel forming region 662a of the thin film transistor. In this manner, a threshold voltage of the thin film transistor can be controlled. In this case, impurity elements which impart conductivity may be added to the semiconductor layer 660 at approximately the same concentration as the channel forming region 662a of the thin film transistor.

A single layer or a stack of a plurality of layers formed of silicon oxide, silicon nitride, silicon nitride oxide or the like may be used as a first insulating film 663. In this case, high density plasma is applied to the surface of the first insulating film 663 in an oxidized atmosphere or a nitrided atmosphere, thereby the first insulating film 663 may be oxidized or nitrided to be densified. The high density plasma is, for example, generated by using a high frequency of 2.45 GHz as described above. It is to be noted that high density plasma with an electron density of $10^{11}$ to $10^{13}$/cm$^{-3}$ or higher and an electron temperature of 2 eV or lower, and an ion energy of 5 eV or lower is used. Plasma can be generated by using a plasma processing apparatus utilizing a radio frequency excitation, which employs a radial slot antenna. The antenna which generates a radio frequency and the substrate 600 are placed at a distance of 20 to 80 mm (preferably 20 to 60 mm) in the apparatus for generating high density plasma.

Before forming the first insulating film 663, the surface of the semiconductor layer 662 may be oxidized or nitrided by applying the high density plasma treatment to the surfaces of the semiconductor layer 662 and the semiconductor layer 660. At this time, by performing the treatment in an oxidized atmosphere or a nitrided atmosphere with the substrate 600 at a temperature of 300 to 450° C., a favorable interface can be formed with the first insulating film 663 which is formed thereover.

As the nitrided atmosphere, an atmosphere containing nitrogen (N) and rare gas (containing at least one of He, Ne, Ar, Kr, and Xe), an atmosphere containing nitrogen, hydrogen (H), and rare gas, or an atmosphere containing ammonium ($NH_3$) and rare gas can be used. As the oxidized atmosphere, an atmosphere containing oxygen (O) and rare gas, an atmosphere containing oxygen and hydrogen (H), and rare gas or an atmosphere containing dinitrogen monoxide ($N_2O$) and rare gas can be used.

As the gate electrode 664, an element selected from Ta, W, Ti, Mo, Al, Cu, Cr, and Nd, an alloy or a compound containing a plurality of the aforementioned elements can be used. Alternatively, a single layer structure or a stacked-layer structure formed of the aforementioned element, an alloy or a compound thereof may also be employed. In the drawings (FIGS. 6C, 6D), the gate electrode 664 has a two-layer structure. It is to be noted that the gate electrode 664 and a wire which is formed simultaneously with the gate electrode 664 are preferably led so that corner portions thereof are rounded when seen perpendicularly to the top surface of the substrate 600. The gate electrode 664 and the wire can be led similarly to the method shown in FIG. 15B. The gate electrode 664 and the wire which is formed simultaneously with the gate electrode 664 are shown as a wire 362 in the drawings. By rounding corner portions 1502b of the wire 362 of the invention as compared to corner portions 1501b of the conventional wire 362, dusts or the like can be prevented from remaining at the corner portions of the wire. In this manner, defects of a semiconductor device caused by dusts can be reduced and the yield can be improved.

A thin film transistor is formed of the semiconductor layer 662, the gate electrode 664, and a first insulating film 663 which functions as a gate insulating film between the semiconductor layer 662 and the gate electrode 664. In this embodiment, the thin film transistor has a top gate structure, however, it may be a bottom gate transistor having a gate electrode under the semiconductor layer, or a dual gate transistor having gate electrodes over and under the semiconductor layer.

It is preferable that a second insulating film 667 is an insulating film such as a silicon nitride film having a barrier property to block ion impurities. The second insulating film 667 is formed of silicon nitride or silicon oxynitride. The second insulating film 667 functions as a protective film which prevents contamination of the semiconductor layer 662 and the semiconductor layer 660. By introducing hydrogen gas and applying the aforementioned high density plasma treatment after depositing the second insulating film 667, the second insulating film 667 may be hydrogenated. Alternatively, the second insulating film 667 may be nitrided and hydrogenated by introducing ammonium gas (NH$_3$). Otherwise, oxidization-nitridation treatment and hydrogenation treatment may be performed by introducing oxygen, dinitrogen monoxide (N$_2$O) gas, or the like together with hydrogen gas. By performing nitridation treatment, oxidization treatment, or oxidization-nitridation treatment by this method, the surface of the second insulating film 667 can be densified. In this manner, a function of the second insulating film 667 as a protective film can be enhanced. Hydrogen introduced in the second insulating film 667 is discharged when thermal treatment at 400 to 450° C. is applied, thereby the semiconductor layer 662 and the semiconductor layer 660 can be hydrogenated. It is to be noted that the hydrogenation may be performed in combination with hydrogenation using the first insulating film 663.

A third insulating film 665 can be formed of a single layer structure or a stacked-layer structure of an inorganic insulating film or an organic insulating film. As an inorganic insulating film, a silicon oxide film formed by a CVD method, a silicon oxide film formed by a SOG (Spin On Glass) method, or the like can be used. As an organic insulating film, a film formed of polyimide, polyamide, BCB (benzocyclobutene), acrylic, a positive photosensitive organic resin, a negative photosensitive organic resin, or the like can be used.

The third insulating film 665 may be formed of a material having a skeleton structure formed of a bond of silicon (Si) and oxygen (O). An organic group containing at least hydrogen (such as an alkyl group or aromatic hydrocarbon) is used as a substituent of this material. Alternatively, a fluoro group may be used as the substituent. Further alternatively, a fluoro group and an organic group containing at least hydrogen may be used as the substituent.

As a wire 666, one element selected from Al, Ni, W, Mo, Ti, Pt, Cu, Ta, Au, and Mn or an alloy containing a plurality of these elements can be used. Alternatively, a single layer structure or a stacked-layer structure formed of the aforementioned element, an alloy or a compound thereof can be used. In the drawing (FIGS. 6C, 6D), a single layer structure is shown as an example. It is to be noted that the wire 666 is preferably led so that corner portions thereof are rounded when seen perpendicularly to the top surface of the substrate 600. The wire can be led similarly to the method shown in FIG. 15B. The wire 666 is shown as a wire 363 in the drawings. By rounding corner portions 1502c of the wire 363 of the invention as compared to corner portions 1501c of the conventional wire 363, dusts or the like can be prevented from remaining at the corner portions of the wire. In this manner, defects of a semiconductor device caused by dusts can be reduced and the yield can be improved. In the structures shown in FIGS. 6A and 6C, the wire 666 functions as a wire connected to a source and a drain of a thin film transistor and also functions as the antenna 304. In the structures shown in FIGS. 6B and 6D, the wire 666 functions as a wire connected to a source and a drain of the thin film transistor and also functions as a terminal portion 602. In FIGS. 15A and 15B, a contact hole 352 to connect the wire 666 and the source and drain of the thin film transistor is provided.

It is to be noted that the antenna 304 can be formed by a droplet discharge method using a conductive paste containing nano-particles such as Au, Ag, and Cu. The droplet discharge method is a collective term for a method to form a pattern by discharging droplets, such as an ink jet method or a dispenser method, which has advantages in that utilization efficiency of a material is improved, and the like.

In the structures shown in FIGS. 6A and 6C, a fourth insulating film 668 is formed over the wire 666. As the fourth insulating film 668, a single layer structure or a stacked-layer structure of an inorganic insulating film or an organic insulating film can be used. The fourth insulating film 668 functions as a protective layer of the antenna 304.

Figure 7A:
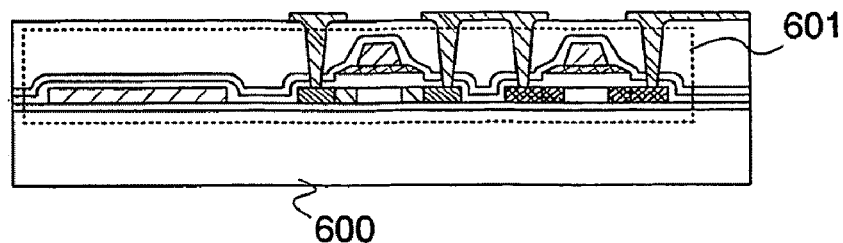
FIGS. 7A to 7C are views showing a manufacturing method of a semiconductor device of the invention and FIG. 7D is a view showing an application thereof.
Figure 7B:
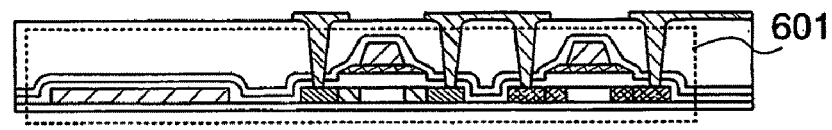
Figure 7C:
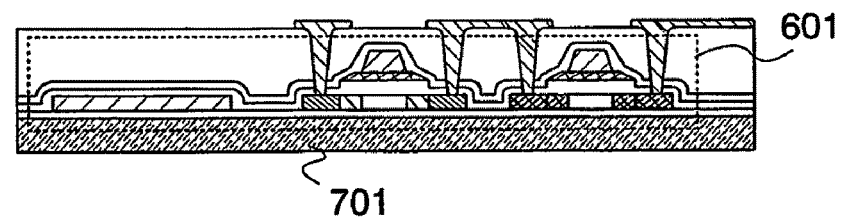
Figure 7D:
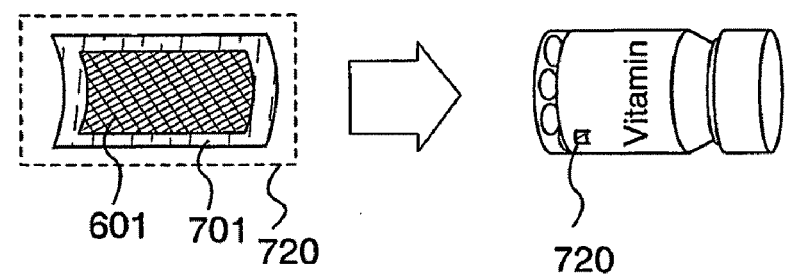

The element group 601 formed over the substrate 600 (see FIG. 7A) may be used as it is, however, the element group 601 may be peeled off the substrate 600 (see FIG. 7B) and attached to a flexible substrate 701 (see FIG. 7C). The flexible substrate 701 has flexibility, for which a plastic substrate, formed of polycarbonate, polyarylate, polyether sulfone, or the like, a ceramic substrate, or the like can be used.

The element group 601 may be peeled off the substrate 600 by (A) providing a peeling layer between the substrate 600 and the element group 601 in advance and removing the peeling layer by using an etchant, (B) partially removing the peeling layer by using an etchant and physically peeling the element group 601 from the substrate 600, or (C) mechanically removing the substrate 600 having high heat resistance over which the element group 601 is formed or removing it by etching with solution or gas. It is to be noted that being physically peeled off corresponds to being peeled off by external stress, for example, stress applied by wind pressure blown from a nozzle, ultrasonic wave, and the like.

The aforementioned methods (A) and (B) are specifically realized by providing a metal oxide film between the substrate 600 having high heat resistance and the element group 601 and weakening the metal oxide film by crystallization to peel off the element group 601, or by providing an amorphous silicon film containing hydrogen between the substrate 600 having high heat resistance and the element group 601 and removing the amorphous silicon film by laser light irradiation or etching to peel off the element group 601.

The element group 601 which has been peeled off may be attached to the flexible substrate 701 by using a commercialized adhesive, for example, an epoxy resin-based adhesive or a resin additive.

When the element group 601 is attached to the flexible substrate 701 over which an antenna is formed so that the element group 601 and the antenna are electrically connected, a semiconductor device which is thin, lightweight, and can withstand shock when dropped is completed (see FIG. 7C). When the flexible substrate 701 is used, an inexpensive semiconductor device can be provided. Moreover, as the flexible substrate 701 has flexibility, it can be attached to a curved surface or an irregular surface, a variety of applications can be realized. For example, a wireless tag 720 as one mode of the semiconductor device of the invention can be tightly attached to, for example, a surface such as one of a medicine bottle (see FIG. 7D). Moreover, by reusing the substrate 600, a semiconductor device can be manufactured at low cost.

This embodiment can be freely implemented in combination with the aforementioned embodiment modes.

Embodiment 2

Figure 8A:
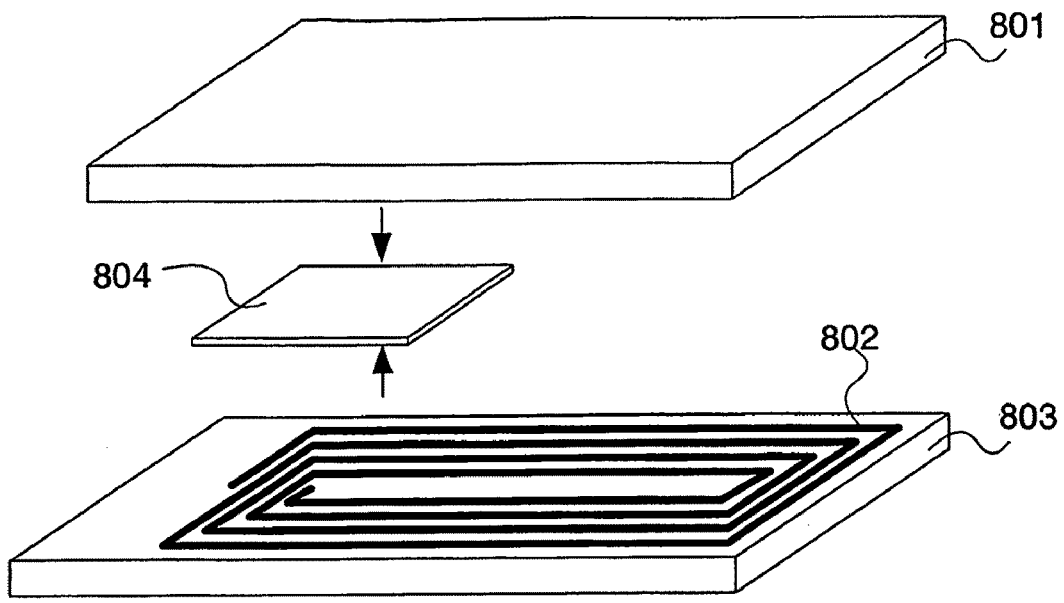
FIGS. 8A to 8C are views showing a manufacturing method of a semiconductor device of the invention.

In this embodiment, a semiconductor device of the invention having a flexible structure is described with reference to FIGS. 8A to 8C. In FIG. 8A, a semiconductor device includes a flexible protective layer 801, a flexible protective layer 803 including an antenna 802, and an element group 804 formed by a peeling process and thinning of a substrate. The element group 804 can have, for example, a similar structure to that of the element group 601 described in Embodiment 1. The antenna 802 formed over the protective layer 803 is electrically connected to the element group 804. In FIG. 8A, the antenna 802 is formed only over the protective layer 803, however, the invention is not limited to this structure and the antenna 802 may be formed over the protective layer 801 as well. It is to be noted that a barrier film formed of a silicon nitride film or the like may be formed between the element group 804 and the protective layer 801, or between the element group 804 and the protective layer 803. As a result, a semiconductor device with improved reliability can be provided without contaminating the element group 804.

The antenna 802 can be formed of Ag, Cu, or a metal plated with Ag or Cu. The element group 804 and the antenna 802 can be connected to each other by using an anisotropic conductive film and applying ultraviolet treatment or ultrasonic wave treatment. It is to be noted that the element group 804 and the antenna 802 may be attached to each other by using a conductive paste.

By sandwiching the element group 804 by the protective layer 801 and the protective layer 803, a semiconductor device is completed (see an arrow in FIG. 8A).

Figure 8B:
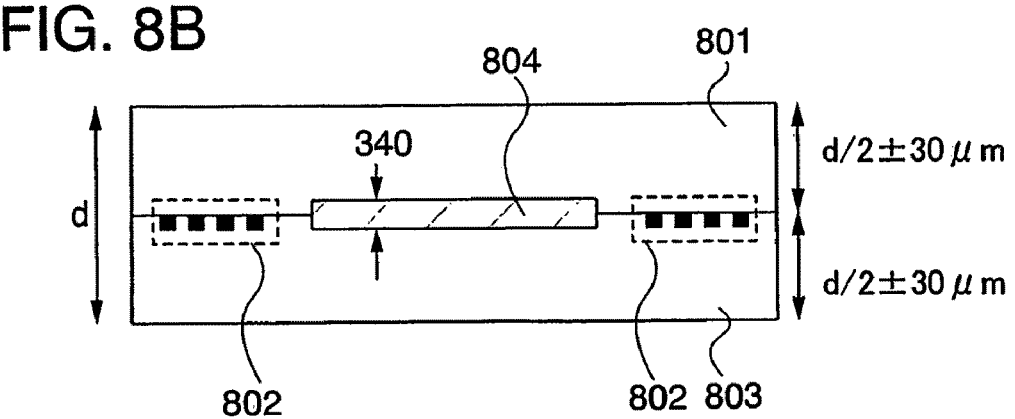

FIG. 8B shows a cross sectional structure of the semiconductor device formed in this manner. The element group 804 which is sandwiched has a thickness 340 of 5 μm or thinner, or preferably 0.1 to 3 μm. Moreover, when the protective layer 801 and the protective layer 803 which are overlapped have a thickness of d, each of the protective layer 801 and the protective layer 803 preferably has a thickness of (d/2)±30 μm, and more preferably (d/2)±10 μm. Further, it is preferable that each of the protective layer 801 and the protective layer 803 have a thickness of 10 to 200 μm. Furthermore, the element group 804 has an area of 10 mm square (100 mm²) or smaller and more preferably 0.3 to 4 mm square (0.09 to 16 mm²).

The protective layer 801 and the protective layer 803 which are formed of an organic resin material have high resistance against bending. The element group 804 which is formed by a peeling process and thinning of a substrate also has higher resistance against bending as compared to a single crystal semiconductor. As the element group 804, the protective layer 801, and the protective layer 803 can be tightly attached to each other without any space, a completed wireless tag has high resistance against bending. The element group 804 surrounded by the protective layer 801 and the protective layer 803 may be provided over a surface of or inside another object or embedded in paper.

Figure 8C:
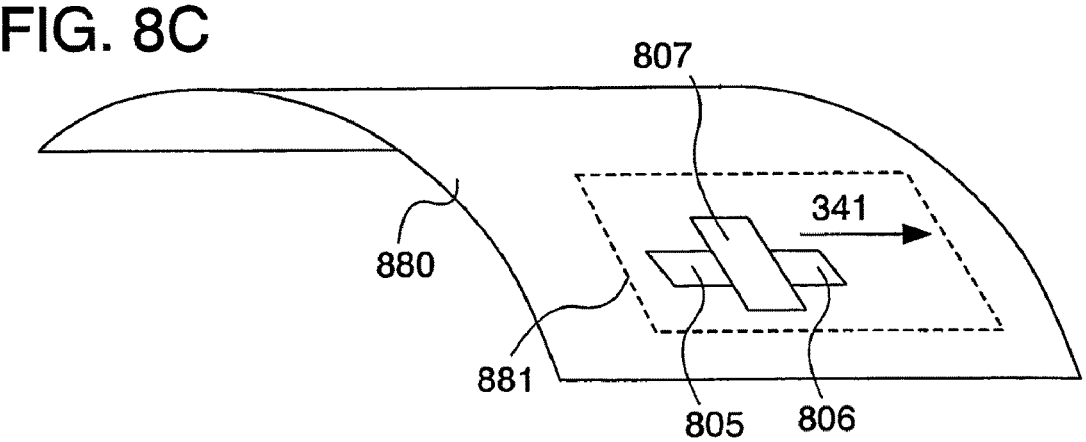

Description is made with reference to FIG. 8C of the case of attaching a semiconductor device including the element group 804 to a substrate having a curved surface. In FIG. 8C, one transistor 881 selected from the element group 804 is shown. In the transistor 881, a current flows from one 805 of a source and a drain to the other 806 of the source and the drain in accordance with a potential of a gate electrode 807. The transistor 881 is provided so that the direction of current flow in the transistor 881 (carrier movement direction 341) and the direction of the arc of the substrate 880 cross at right angles. With such an arrangement, the transistor 881 is less affected by stress even when the substrate 880 is bent and draws an arc, and thus variations in characteristics of the transistor 881 included in the element group 804 can be suppressed.

This embodiment can be freely implemented in combination with the aforementioned embodiment modes and Embodiment 1.

Embodiment 3

In this embodiment, a more specific configuration of a semiconductor device of the invention is described with reference to FIG. 9. It is to be noted that the same portions in FIG. 9 to those in FIGS. 1 and 2 are denoted by the same reference numerals and description thereof are omitted.

Figure 9:
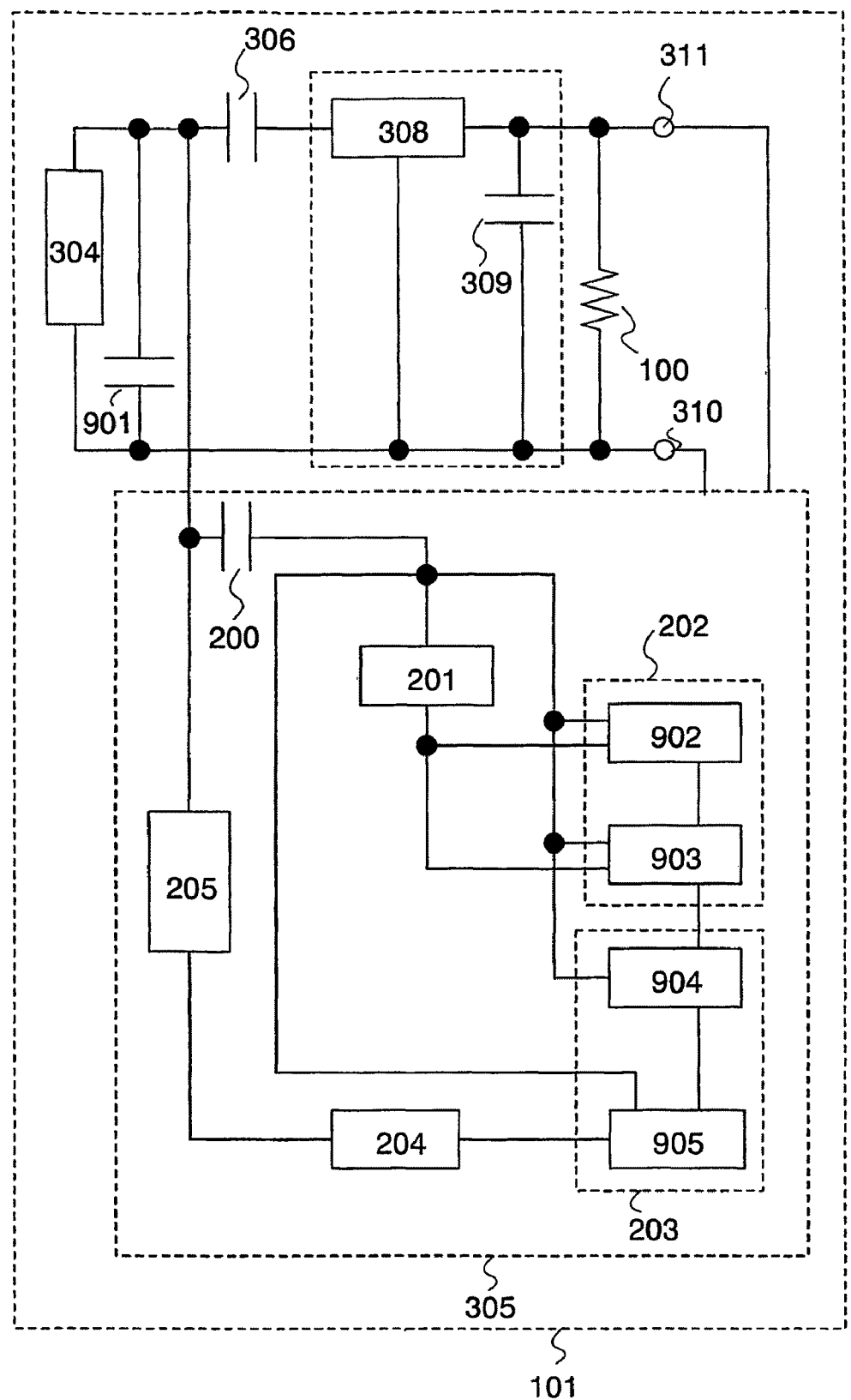
FIG. 9 is a diagram showing a configuration of a semiconductor device of the invention.

The semiconductor device 101 shown in FIG. 9 includes a resonant capacitor 901 which is connected in parallel to the antenna 304. With the resonant capacitor 901, wireless signals at a predetermined frequency can be easily received.

Further, the analyzing circuit 202 includes a clock correction/counter circuit 902 and a code extraction/recognition determining circuit 903. The clock correction/counter circuit 902 generates a control signal for controlling another circuit from the received signal. The code extraction/recognition determining circuit 903 analyzes information outputted from the demodulation circuit 210 by using the control signal in accordance with a predetermined rule. In this manner, the analyzing circuit 202 analyzes and outputs information.

The memory 203 includes a memory controller 904 and a mask ROM 905. The memory controller 904 generates a signal for operating the mask ROM by using the data outputted from the analyzing circuit 202. In this manner, the memory controller 904 controls an information output from the mask ROM 905 while the memory 203 outputs information.

Figure 16:
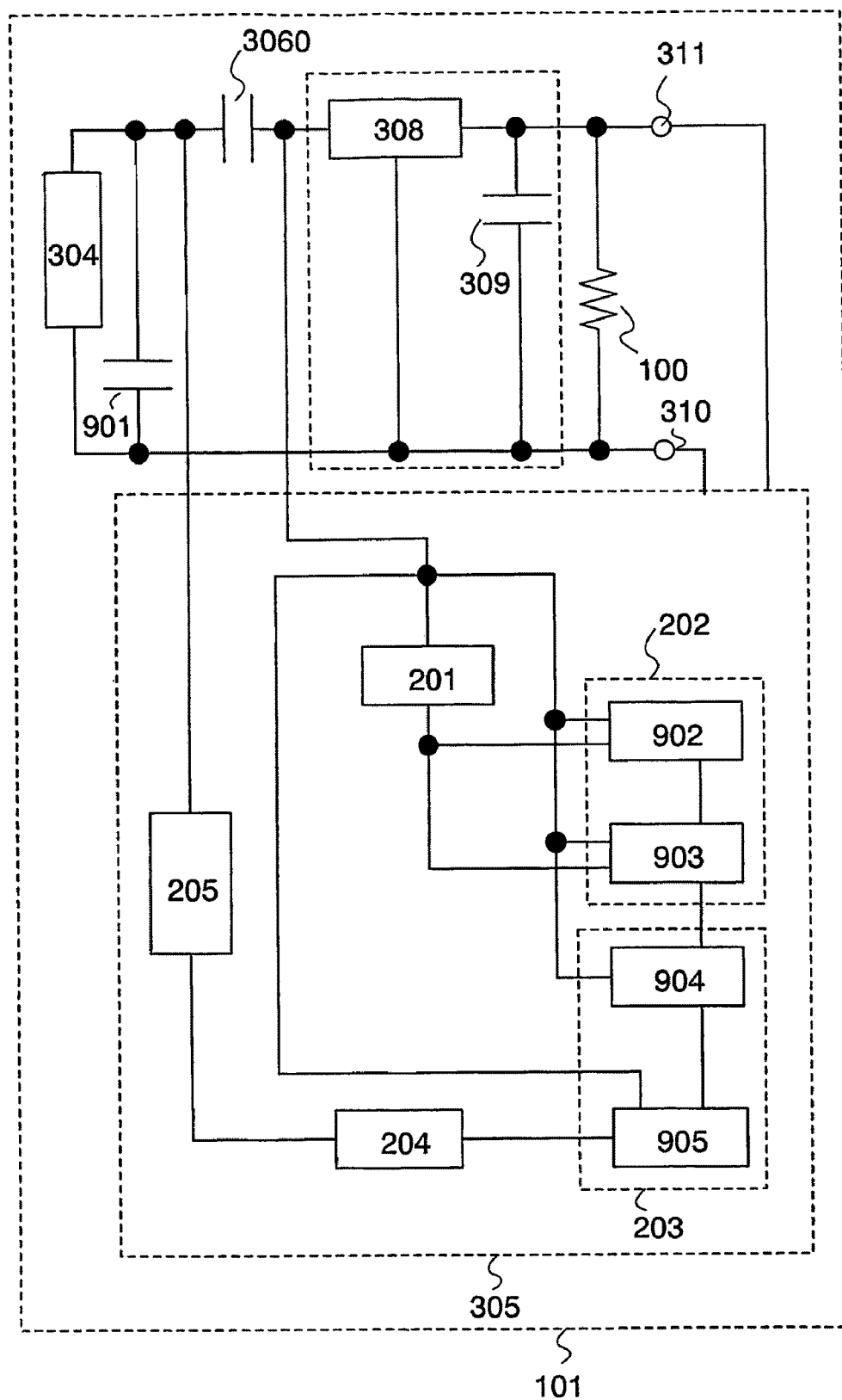
FIG. 16 is a diagram showing a configuration of a semiconductor device of the invention.

In the semiconductor device 101 shown in FIG. 9, capacitors are used as the band-pass filter 306 and the band-pass filter 200 as an example. One of a pair of electrodes of the capacitor as the band-pass filter 306 is connected to one of a pair of terminals of the antenna 304 while the other electrode of the capacitor as the band-pass filter 306 is connected to an input of the power source circuit 307. One of a pair of electrodes of the capacitor as the band-pass filter 200 is connected to one of the pair of terminals of the antenna 304 while the other electrode of the capacitor as the band-pass filter 200 is connected to an input of the demodulation circuit 201. It is to be noted that the capacitor as the band-pass filter 200 and the capacitor as the band-pass filter 306 may be used in common (a band-pass filter 3060 in FIG. 16).

This embodiment can be freely implemented in combination with the aforementioned embodiment modes and Embodiments 1 and 2.

Embodiment 4

In this embodiment, an example actually manufactured the semiconductor device described with reference to FIG. 9 in Embodiment 3 is described with reference to FIGS. 10 and 11.

Figure 10:
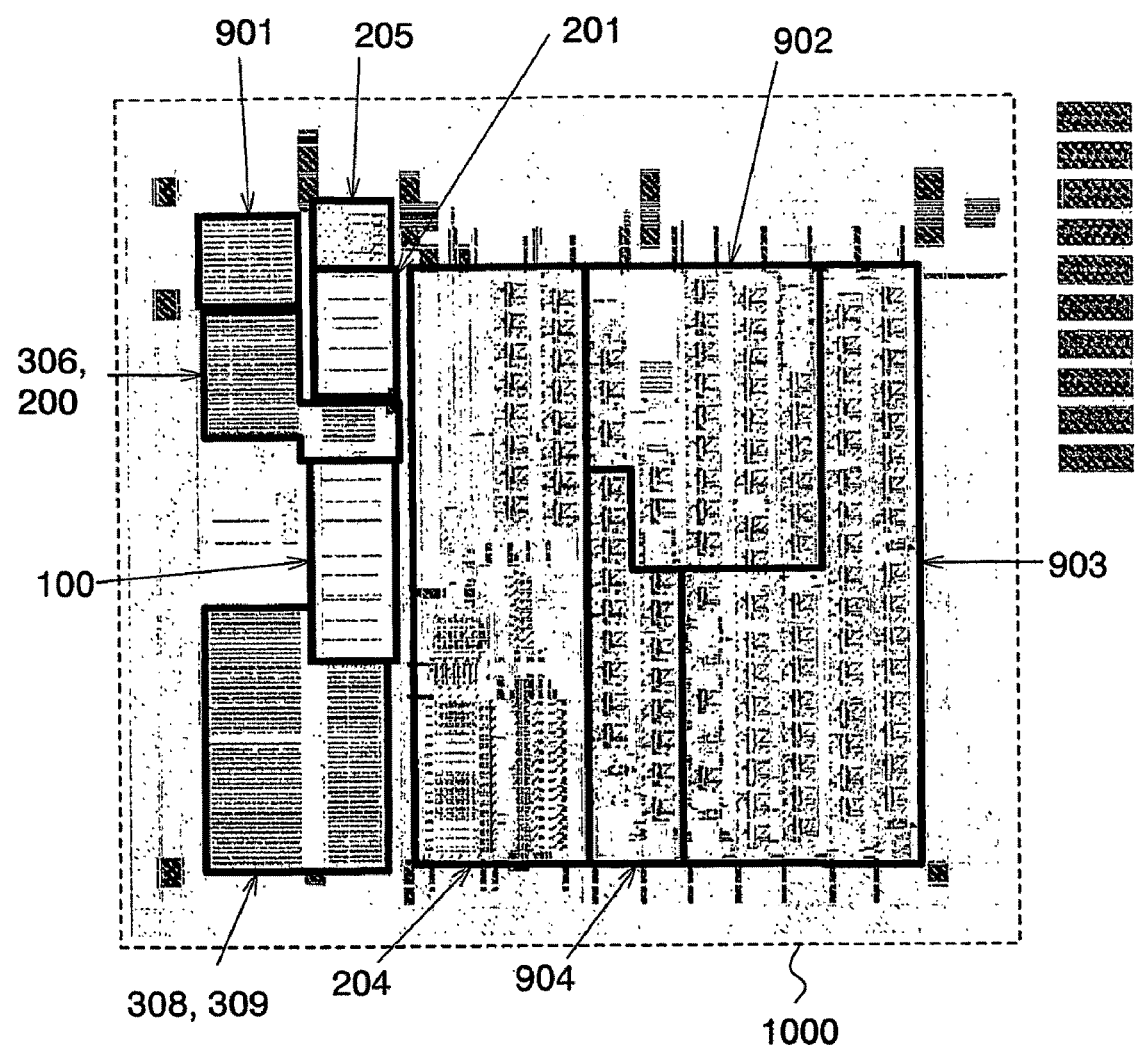
FIG. 10 is a view showing a configuration of a semiconductor device of the invention besides an antenna.

FIG. 10 is a mask layout showing a circuit 1000 besides the antenna 304 in the semiconductor device 101. In FIG. 10, the same portions as those in FIG. 9 are denoted by the same reference numerals and description thereof is omitted. The resistor 100 was formed using a semiconductor layer which is formed simultaneously with a semiconductor layer having a function as an active layer of a thin film transistor which forms another circuit.

Figure 11:
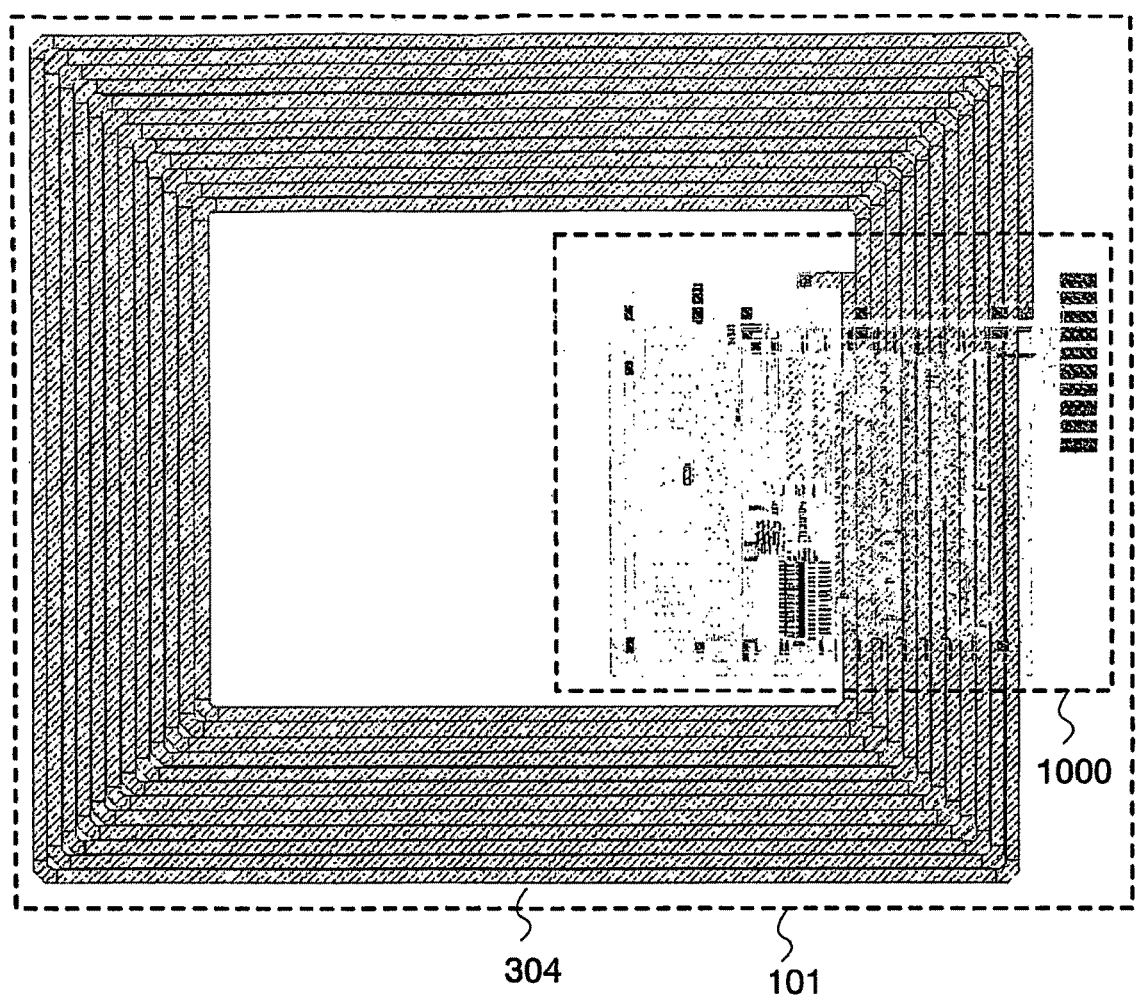
FIG. 11 is a view showing a configuration of a semiconductor device of the invention.

FIG. 11 is a mask layout of the semiconductor device 101 including the antenna 304. In FIG. 11, the same portions as those in FIG. 9 are denoted by the same reference numerals and description thereof is omitted.

This embodiment can be freely implemented in combination with the aforementioned embodiment modes and Embodiments 1 to 3.

Embodiment 5

Figure 12A:
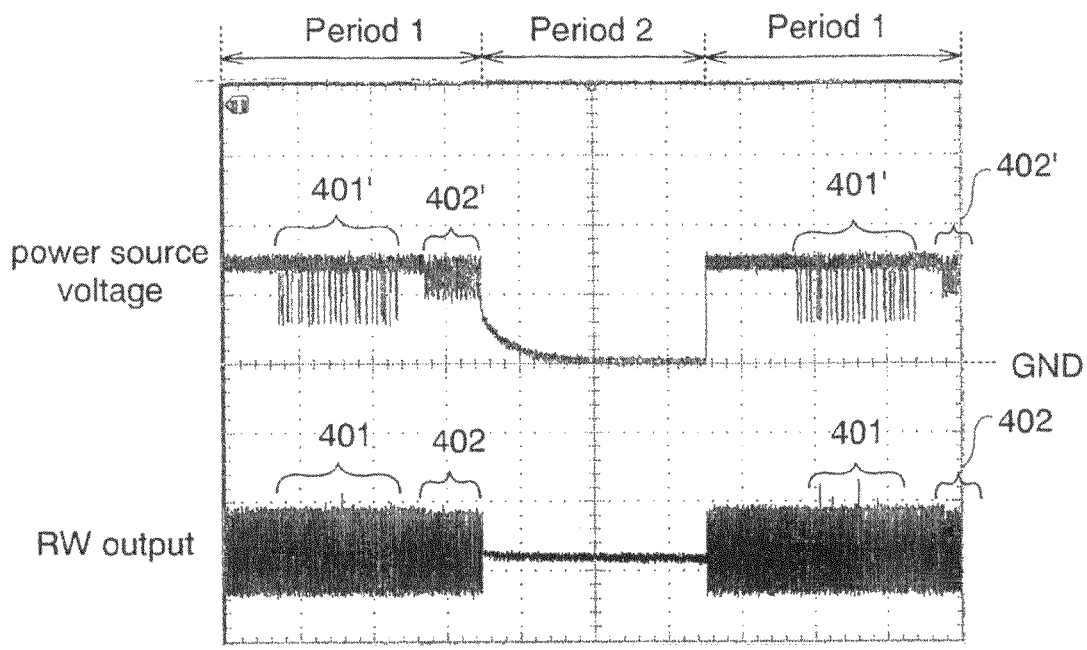
FIG. 12A is a diagram showing characteristics of a semiconductor device of the invention and FIG. 12B is a diagram showing characteristics of a conventional semiconductor device.
Figure 12B:
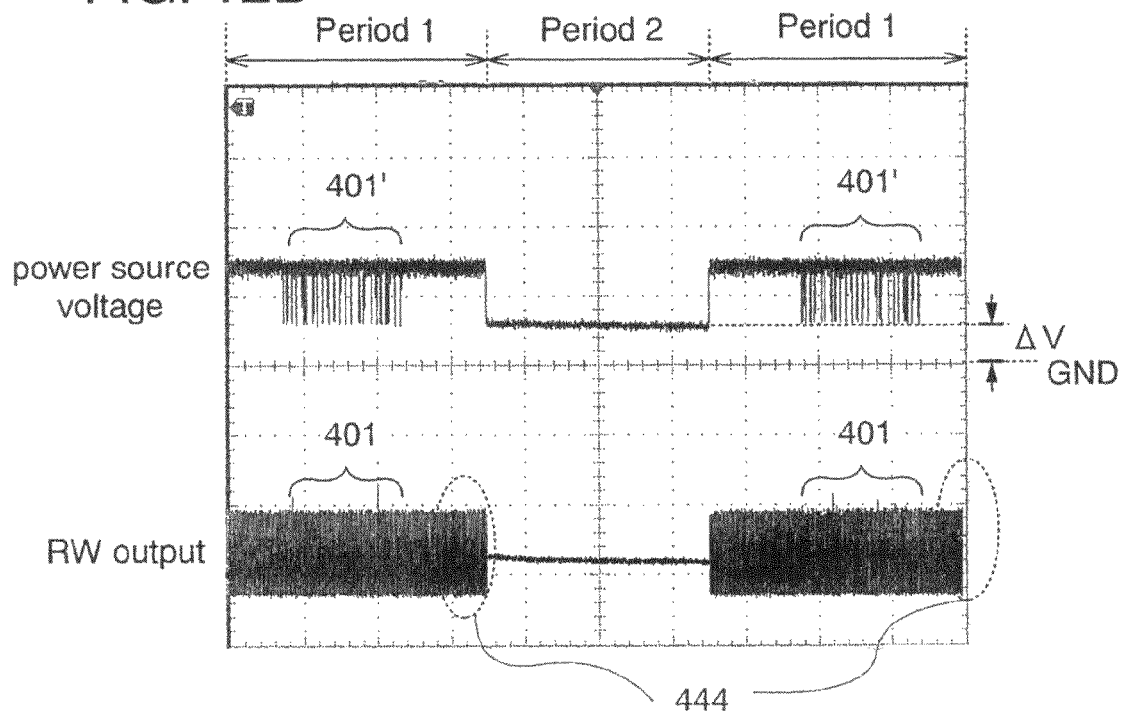

FIGS. 12A and 12B show measurement results of the characteristics of the semiconductor device 101 of the invention. The measurement was performed by changing the electric resistance of the resistor 100 in the range of 500 k$\Omega$ to 2 M$\Omega$. For comparison, a sample without the resistor 100 was manufactured and measured. As measurement results, waveforms of signals applied to an antenna connected to a reader/writer (expressed as an RW output in the drawings) and waveforms of a power source voltage of a semiconductor device which performs transmission and reception of data with the reader/writer (expressed as a power source voltage in the drawings) are shown. The frequency of a carrier wave was set at 13.56 MHz. The potential of the first terminal 310 is set at a ground potential (expressed as GND in the drawings). The holding capacitor 309 was set to have a capacitance of 500 pF. In FIGS. 12A and 12B, the same portions as those in FIGS. 4A and 4B are denoted by the same reference numerals. The waveforms of the modulated carrier waves shown in FIGS. 4A and 4B correspond to the RW outputs in FIGS. 12A and 12B.

FIG. 12A shows a measurement result of the characteristics of the semiconductor device 101 using the resistor 100 having an electric resistance of 500 k$\Omega$. FIG. 12B shows a measurement result of the characteristics of a semiconductor device (a conventional semiconductor device) without the resistor 100.

As shown in FIG. 12A, in the semiconductor device 101, the power source voltage is zero or the potential of the second terminal 311 is close to the potential of the first terminal 310 in a period in which there is no RW output (period 2). Moreover, when a first signal 401 is outputted to the semiconductor device 101, a second signal 402 is outputted from the semiconductor device 101 in response to the first signal 401, which is seen in the RW output. Meanwhile, in a conventional semiconductor device of which measurement result is shown in FIG. 12B, the power source voltage is not zero or the potential of the second terminal 311 is not close to the potential of the first terminal 310 in the period in which there is no RW output (period 2). Moreover, even when the first signal 401 is outputted to the semiconductor device in RW output, a signal in response to the first signal 401 is not outputted from the semiconductor device 101 (see the waveforms 444 in FIG. 12B).

By using the resistor 100 having an electric resistance of 500 k$\Omega$ to 2 M$\Omega$ in this manner, the semiconductor device 101 can be initialized and operate normally.

It is to be noted in FIGS. 12A and 12B that the power source voltage changes when the first signal 401 is outputted from the reader/writer (expressed by 401' in FIGS. 12A and 12B). Moreover, the power source voltage changes when the semiconductor device 101 responses, that is when the second signal 402 is outputted (expressed by 402' in FIG. 12A). These changes in the power source voltage do not spoil the effect of the invention.

This embodiment can be freely implemented in combination with the aforementioned embodiment modes and Embodiments 1 to 4.

Embodiment 6

In this embodiment, applications of the semiconductor device 101 of the invention are described with reference to FIGS. 13A to 14E. The semiconductor device 101 can be applied to paper money, coins, securities, unregistered bonds, documents (a driver's license or a resident's card; see FIG. 14A), packaging containers (wrapping paper or a bottle; see FIG. 14B), recording media (see FIG. 14C) such as DVD software, a compact disc, and a video tape. In addition, the semiconductor device 101 can be applied to means of transportation such as cars and motor bicycles (see FIG. 14D), personal belongings such as bags and glasses (see FIG. 14E), groceries, clothes, daily commodities, and electronic devices. The electronic devices include liquid crystal display devices, EL display devices, television devices (also simply called televisions or television receivers), portable phones, and the like.

The semiconductor device 101 can be attached to a surface of an object or embedded in an object to be fixed. For example, the semiconductor device 101 is preferably embedded in paper of a book or in an organic resin of a package formed of an organic resin. By providing the semiconductor device 101 in paper money, coins, securities, unregistered bonds, documents, and the like, forgery thereof can be prevented. Moreover, by providing the semiconductor device 101 in packaging containers, recording media, personal belongings, groceries, clothes, daily commodities, electronic devices, and the like, efficiency of the inspection system and the system of a rental shop can be facilitated. Moreover, by providing the semiconductor device 101 in means of transportation, forgery and theft thereof can be prevented. By implanting the semiconductor device 101 in living things such as animals, each living thing can be easily identified. For example, by implanting a wireless tag in living things such as domestic animals, its year of birth, sex, breed, and the like can be easily recognized.

As described above, the semiconductor device 101 of the invention can be applied to any object (including living things).

The semiconductor device 101 has various advantages in that it can transmit and receive data through wireless communication, it can be processed into various shapes, it has a wide directivity and recognition area depending on the selected frequency, and the like.

Figure 13A:
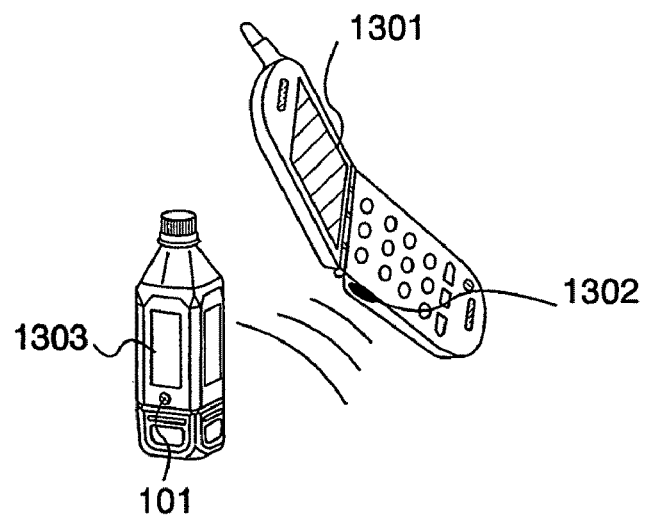
FIGS. 13A and 13B are views showing systems using a semiconductor device of the invention.
Figure 13B:
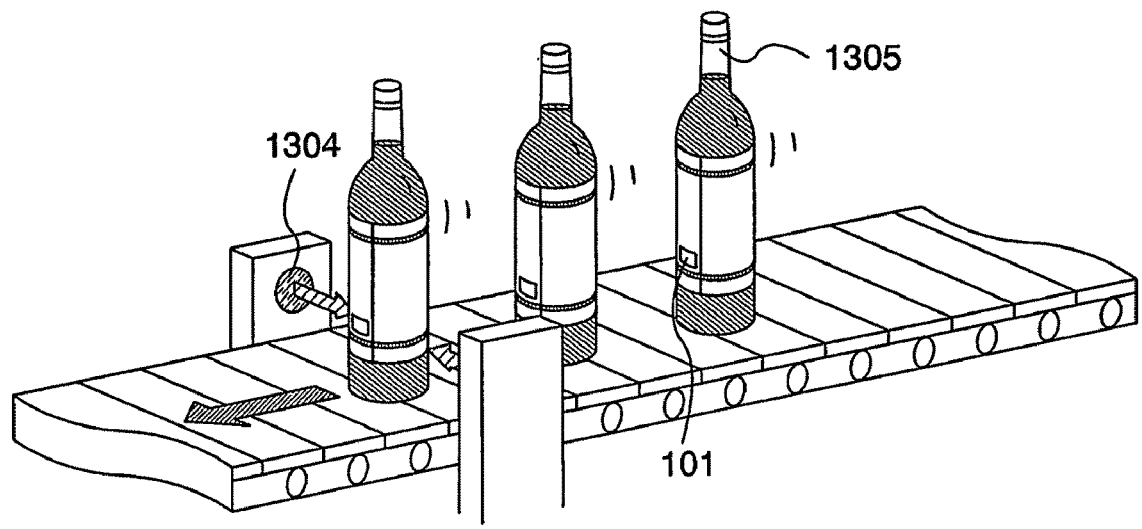
Figure 14A:
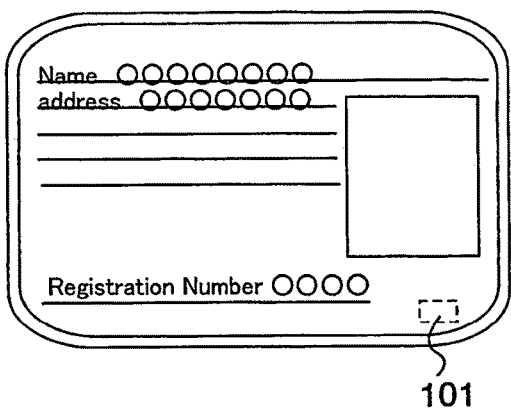
FIGS. 14A to 14E are views illustrating applications of a semiconductor device of the invention.
Figure 14B:
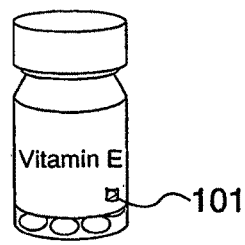
Figure 14C:
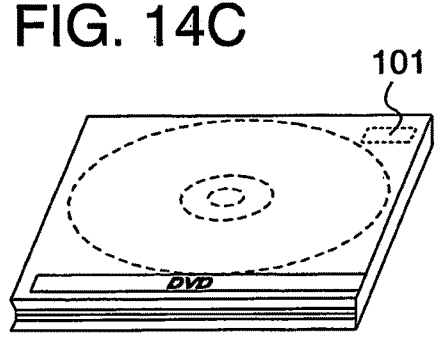
Figure 14D:
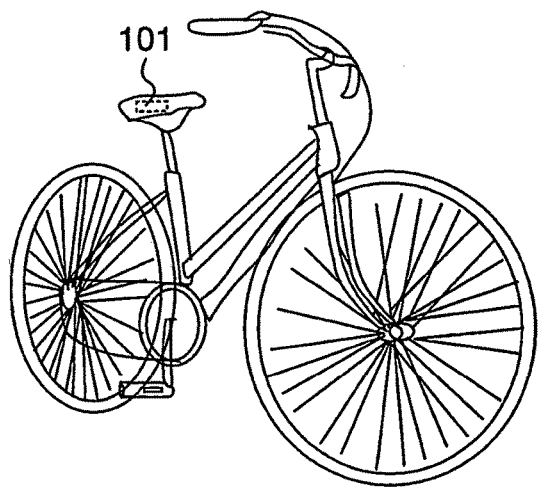
Figure 14E:
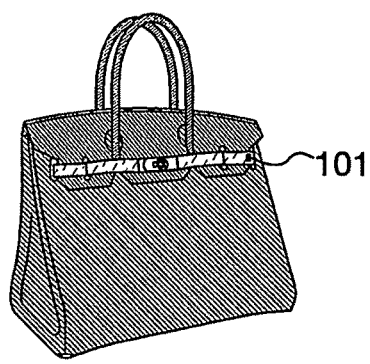

Next, one mode of a system utilizing the semiconductor device 101 is described with reference to FIGS. 13A and 13B. A reader/writer 1302 is provided on a side surface of a portable terminal including a display portion 1301. The semiconductor device 101 is provided on a side surface of an object 1303 (see FIG. 13A). When the reader/writer 1302 is held near the semiconductor device 101 attached to the object 1303, the display portion 1301 displays information about the object such as a raw material, a place of origin, a test result of every process, a record of circulation, and description of the object. As another system, in the case of carrying an object 1305 by a conveyer belt, the object 1305 can be inspected by using the reader/writer 1304 and the semiconductor device 101 (see FIG. 13B). In this manner, by applying the semiconductor device 101 of the invention to a system, information can be obtained easily and a system with high function and high added value can be provided.

This embodiment can be freely implemented in combination with the aforementioned embodiment modes and Embodiments 1 to 5.

This application is based on Japanese Patent Application serial no. 2005-147059 filed in Japan Patent Office on 19, May, 2005, the entire contents of which are hereby incorporated by reference.

EXPLANATION OF REFERENCE

100: resistor, 101: semiconductor device, 200: band-pass filter, 201: demodulation circuit, 202: analyzing circuit, 203: memory, 204: encoding circuit, 205: modulation circuit, 300: reader/writer, 301: antenna, 302: control terminal, 303: wireless tag, 304: antenna, 305: signal processing circuit, 306: band-pass filter, 307: power source circuit, 308: rectifying circuit, 309: holding capacitor, 310: first terminal, 311: second terminal, 330: modulated carrier wave, 331: potential of second terminal 311, 332: potential of first terminal 310, 340: thickness, 341: carrier movement direction, 351: perpendicular direction, 352: contact hole, 361: wire, 362: wire, 363: wire, 401: first signal, 402: second signal, 444: waveform, 500: reader/writer, 501: oscillation circuit, 502: encoding circuit, 503: modulation circuit, 504: amplifier circuit, 505: antenna, 506: band-pass filter, 507: amplifier circuit, 508: demodulation circuit, 509: analyzing circuit, 510: control terminal, 600: substrate, 601: element group, 602: terminal portion, 603: conductive particle, 604: resin, 610: substrate, 660: semiconductor layer, 661: base film, 662: semiconductor layer, 662a: channel forming region, 662b: impurity region, 662c: low concentration impurity region, 663: first insulating film, 664: gate electrode, 665: third insulating film, 666: wire, 667: second insulating film, 668: fourth insulating film, 701: flexible substrate, 720: wireless tag, 801: protective layer, 802: antenna, 803: protective layer, 804: element group, 805: one of source and drain, 806: the other of source and drain, 807: gate electrode, 880: substrate, 881: transistor, 901: resonant capacitor, 902: clock correction/counter circuit, 903: code extraction/recognition determining circuit, 904: memory controller, 905: mask ROM, 1000: circuit, 1301: display portion, 1302: reader/writer, 1303: object, 1304: reader/writer, 1305: object, 1501a: corner, 1501b: corner, 1501c: corner, 1502a: corner, 1502b: corner, 1502c: corner

The invention claimed is:

1. A semiconductor device comprising:
   an antenna transmitting and receiving a modulated carrier wave;
   a band-pass filter connected to the antenna;
   a power source circuit including a first terminal and a second terminal and generating a DC voltage between the first terminal and the second terminal by the modulated carrier wave inputted through the band-pass filter;
   a circuit using the DC voltage as a power source voltage; and
   a resistor connected to the first terminal and the second terminal,
   wherein the power source circuit comprises a rectifying circuit which rectifies the inputted modulated carrier wave through the band-pass filter and converts the inputted modulated carrier wave to a DC signal and a holding capacitor which smoothes the DC signal outputted from the rectifying circuit, and
   wherein the power source circuit outputs the DC signal smoothed by the holding capacitor as the DC voltage.

2. The semiconductor device according to claim 1, wherein the same potential is applied to a terminal of the antenna and the first terminal.

3. The semiconductor device according to claim 1, wherein a terminal of the antenna and the first terminal are grounded.

4. The semiconductor device according to claim 1, wherein the circuit using the DC voltage as the power source voltage comprises a demodulation circuit which demodulates the modulated carrier wave, an analyzing circuit which analyzes data demodulated by the demodulation circuit, and a memory which operates based on the data analyzed by the analyzing circuit.

5. The semiconductor device according to claim 4, wherein the circuit using the DC voltage as the power source voltage further comprises an encoding circuit which encodes the data read from the memory, and a modulation circuit which modulates a carrier wave in accordance with the data encoded by the encoding circuit.

6. The semiconductor device according to claim 4, wherein the memory is any one of a DRAM, an SRAM, a FeRAM, a mask ROM, an EPROM, an EEPROM, and a flash memory.

7. The semiconductor device according to claim 1, wherein the resistor has electric resistance of 500 k$\Omega$ to 2 M$\Omega$.

8. The semiconductor device according to claim 1, wherein the resistor is formed by a semiconductor layer.

9. The semiconductor device according to claim 1, wherein the circuit using the DC voltage as the power source voltage comprises a thin film transistor, and
   wherein the resistor is formed by a semiconductor layer formed simultaneously with a semiconductor layer which functions as an active layer of the thin film transistor.

10. The semiconductor device according to claim 9, wherein an impurity element which imparts conductivity is added to the semiconductor layer of the resistor.

11. The semiconductor device according to claim 9, wherein an impurity element which imparts conductivity is added to the semiconductor layer of the resistor at approximately the same concentration as a channel forming region of the thin film transistor.

12. The semiconductor device according to claim 1, wherein the antenna is any one of a dipole antenna, a patch antenna, a loop antenna, and a Yagi antenna.

13. The semiconductor device according to claim 1, wherein the modulated carrier wave is formed by modulating a carrier wave in an analog modulation method or a digital modulation method.

14. The semiconductor device according to claim 1, wherein the antenna transmits and receives the modulated carrier wave by any one of an electromagnetic coupling method, an electromagnetic induction method, and a radio wave method.

* * * * *